United States Patent
Arashin et al.

(10) Patent No.: US 9,288,787 B2
(45) Date of Patent: Mar. 15, 2016

(54) ACCESS POINT TERMINAL, WIRELESS COMMUNICATION TERMINAL, WIRELESS COMMUNICATION SYSTEM, WIRELESS COMMUNICATION METHOD, PROGRAM AND INTEGRATED CIRCUIT

(75) Inventors: Nobuhiko Arashin, Osaka (JP); Osamu Tanaka, Osaka (JP); Toyoshi Yamada, Osaka (JP); Masahiko Nagoshi, Osaka (JP); Akihiko Shiotsuki, Osaka (JP); Akira Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 728 days.

(21) Appl. No.: 13/398,089

(22) Filed: Feb. 16, 2012

(65) Prior Publication Data
US 2012/0147777 A1    Jun. 14, 2012

Related U.S. Application Data

(63) Continuation of application No. PCT/JP2011/003531, filed on Jun. 21, 2011.

(30) Foreign Application Priority Data

Jun. 21, 2010  (JP) ................................ 2010-141045

(51) Int. Cl.
*H04W 72/02* (2009.01)
*H04W 72/04* (2009.01)
(Continued)

(52) U.S. Cl.
CPC .......... *H04W 72/02* (2013.01); *H04W 72/0406* (2013.01); *H04W 48/08* (2013.01); *H04W 72/048* (2013.01); *H04W 72/0453* (2013.01); *H04W 72/085* (2013.01); *H04W 88/08* (2013.01)

(58) Field of Classification Search
None
See application file for complete search history.

(56) References Cited

U.S. PATENT DOCUMENTS 8,010,049 B2    8/2011  Kawasaki
8,228,973 B2    7/2012  Ishii et al.
(Continued)

FOREIGN PATENT DOCUMENTS

CN    101047944    10/2007
CN    101064563    10/2007
(Continued)

OTHER PUBLICATIONS

International Search Report issued Sep. 6, 2011 in International (PCT) Application No. PCT/JP2011/003531.
(Continued)

*Primary Examiner* — Hassan Phillips
*Assistant Examiner* — Saba Tsegaye
(74) *Attorney, Agent, or Firm* — Wenderoth, Lind & Ponack, L.L.P.

(57) ABSTRACT

An access point terminal includes: a communication-terminal-status determination unit which determines a communication status of one wireless communication terminal out of wireless communication terminals, by obtaining a wireless signal transmitted or received by the one wireless communication terminal; and a frequency control unit which uses (i) a first frequency band for wireless communication with the one wireless communication terminal and (ii) a frequency band other than the first frequency band for the wireless communication with one or more of the wireless communication terminals other than the one wireless communication terminal, when the communication-terminal-status determination unit determines that the communication status of the one wireless communication terminal satisfies a predetermined condition.

5 Claims, 24 Drawing Sheets

(51) Int. Cl.
*H04W 88/08* (2009.01)
*H04W 48/08* (2009.01)
*H04W 72/08* (2009.01)

(56) References Cited

U.S. PATENT DOCUMENTS

| | | | |
|---|---|---|---|
| 8,331,345 B1* | 12/2012 | Loc et al. | 370/345 |
| 8,582,445 B2* | 11/2013 | Gonikberg | 370/242 |
| 2004/0087268 A1 | 5/2004 | Hatano | |
| 2004/0215769 A1 | 10/2004 | Yoshida et al. | |
| 2006/0073827 A1 | 4/2006 | Vaisanen et al. | |
| 2006/0117174 A1* | 6/2006 | Lee | 713/154 |
| 2006/0268767 A1 | 11/2006 | Sato et al. | |
| 2007/0232238 A1 | 10/2007 | Kawasaki | |
| 2007/0253473 A1 | 11/2007 | Ishii et al. | |
| 2009/0252097 A1* | 10/2009 | Iyer et al. | 370/329 |
| 2010/0034120 A1 | 2/2010 | Nakajima | |
| 2011/0026441 A1* | 2/2011 | Diener et al. | 370/260 |
| 2011/0090896 A1* | 4/2011 | Bradley | 370/350 |
| 2012/0269249 A1 | 10/2012 | Ishii et al. | |
| 2013/0148529 A1* | 6/2013 | Stacey et al. | 370/252 |

FOREIGN PATENT DOCUMENTS

| | | |
|---|---|---|
| JP | 2004-153529 | 5/2004 |
| JP | 2004-328319 | 11/2004 |
| JP | 2004-356855 | 12/2004 |
| JP | 2006-513600 | 4/2006 |
| JP | 2007-214657 | 8/2007 |
| JP | 2010-041666 | 2/2010 |
| WO | 2004/057899 | 7/2004 |

OTHER PUBLICATIONS

Office Action and Search Report issued May 6, 2015 in corresponding Chinese Application No. 201180029392.9, with partial English translation.

* cited by examiner

FIG. 5

M1 Message Field

| Attribute | R/O | Notes |
|---|---|---|
| Version | R | 0x10=version 1.0, 0x11=version 1.1, etc. |
| Message Type | R | Value is 0x04 for M1. |
| UUID-E | R | |
| MAC Address | R | |
| Enrollee Nonce | R | |
| Public Key | R | Diffie-Hellman key of Enrollee. Key size and Group are implied by the attribute data size. |
| Authentication Type Flags | R | |
| Encryption Type Flags | R | |
| Connection Type Flags | R | |
| Config Methods | R | |
| Wi-Fi Protected Setup State | R | |
| Manufacturer | R | |
| Model Name | R | |
| Model Number | R | |
| Serial Number | R | |
| Primary Device Type | R | |
| Device Name | R | |
| RF Bands | R | Specific RF band used for this message |
| Association State | R | |
| Device Password ID | R | |
| Configuration Error | R | |
| OS Version | R | |
| other | R | Multiple attributes are permitted |
| New Field | R | |

FIG. 6

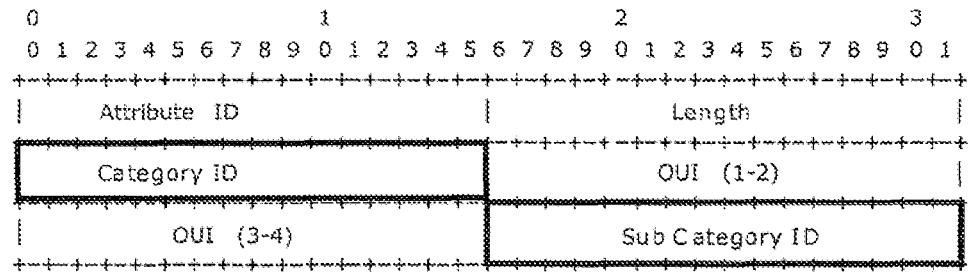

| Category | ID Value | Sub Category | ID Value |
|---|---|---|---|
| Computer | 1 | PC | 1 |
| | | Server | 2 |
| | | Media Center | 3 |
| Input Device | 2 | | |
| Printers, Scanners, Faxes and Copiers | 3 | Printer | 1 |
| | | Scanner | 2 |
| Camera | 4 | Digital Still Camera | 1 |
| Storage | 5 | NAS | 1 |
| Network Infrastructure | 6 | AP | 1 |
| | | Router | 2 |
| | | Switch | 3 |
| Displays | 7 | Television | 1 |
| | | Electronic Picture Frame | 2 |
| | | Projector | 3 |
| Multimedia Devices | 8 | DAR | 1 |
| | | PVR | 2 |
| | | MCX | 3 |
| Gaming Devices | 9 | Mbox | 1 |
| | | Mbox360 | 2 |
| | | Playstation | 3 |
| Telephone | 10 | Windows Mobile | 1 |
| | | | |
| | | | |

FIG. 7A

| Terminal | MAC | 2.4 GHz band | 5 GHz band |
|---|---|---|---|
| STA2 | MAC-A | 1 | 1 |
| STA3 | MAC-B | 1 | 1 |
| STA4 | MAC-C | 0 | 1 |
| STA5 | MAC-D | 1 | 0 |

☐ Induction frequency band

FIG. 7B

| Terminal | MAC | 2.4 GHz band | 5 GHz band |
|---|---|---|---|
| STA2 | MAC-A | 0 | 1 |
| STA3 | MAC-B | 0 | 1 |
| STA4 | MAC-C | 0 | 1 |
| STA5 | MAC-D | 1 | 0 |

☐ Induction frequency band

FIG. 8A

Conversion table

| Category | Sub Category | Band |
|---|---|---|
| Displays | Television | 5 GHz |
| Multimedia Device | PVR | 5 GHz |
| Computer | PC | 2.4 GHz |
| Computer | Server | 2.4 GHz |
| etc | --- | 2.4 GHz |

FIG. 8B

STA information management table

| Terminal | Category | Sub Category | Band |
|---|---|---|---|
| STA2 | Computer | PC | 2.4 GHz |
| STA3 | Computer | Server | 2.4 GHz |
| STA4 | Displays | Television | 5 GHz |
| STA5 | Multimedia Device | PVR | 5 GHz |

FIG. 9A

Conversion table

| Category | Band |
|---|---|
| Voice | 5 GHz |
| Video | 5 GHz |
| Best Effort | 2.4 GHz |
| Back Ground | 2.4 GHz |

STA information management table

| Terminal | Category | Band |
|---|---|---|
| STA2 | Best Effort | 2.4 GHz |
| STA3 | Back Ground | 2.4 GHz |
| STA4 | Video | 5 GHz |
| STA5 | Video | 5 GHz |

Probe Request@5 GHz

| Terminal | MAC | 2.4 GHz band (CH1) | | 5 GHz band (CH36) | |
|---|---|---|---|---|---|
| | | Support | RSSI | Support | RSSI |
| STA2 | MAC-A | 1 | -60 dBm | 1 | -40 dBm |
| STA3 | MAC-B | 1 | -55 dBm | 1 | -70 dBm |
| STA4 | MAC-C | 0 | --- | 1 | -60 dBm |
| STA5 | MAC-D | 1 | -55 dBm | 0 | --- |

☐ Induction frequency band

FIG. 12

| Terminal | MAC | 2.4 GHz band (CH1) | | 5 GHz band (CH36) | |
|---|---|---|---|---|---|
| | | Support | Intf | Support | Intf |
| STA2 | MAC-A | 1 | High | 1 | Low |
| STA3 | MAC-B | 1 | High | 1 | Low |
| STA4 | MAC-C | 0 | High | 1 | Low |
| STA5 | MAC-D | 1 | High | 0 | Low |

☐ Induction frequency band

FIG. 13

| Terminal | MAC | Device Type | Category | SSID | Band | Channel | 5 GHz Flg | Old Band |
|---|---|---|---|---|---|---|---|---|
| STA2 | MAC-A | Television | Video | SSID-A | 5 GHz | 36 | 1 | — |
| STA3 | MAC-B | PVR | Video | SSID-B | 5 GHz | 36 | 1 | — |
| STA4 | MAC-C | PC | Best Effort | SSID-C | 5 GHz | 36 | 1 | — |
| STA5 | MAC-D | PVR | Video | SSID-D | 2.4 GHz | 1 | 0 | — |

FIG. 15

| Terminal | MAC | Device Type | Category | SSID | Band | Channel | 5 GHz Flg | Old Band |
|---|---|---|---|---|---|---|---|---|
| STA2 | MAC-A | Television | Video | SSID-A | 5 GHz | 36 | 1 | 5 GHz |
| STA3 | MAC-B | PVR | Video | SSID-B | 2.4 GHz | 1 | 1 | 5 GHz |
| STA4 | MAC-C | PC | Best Effort | SSID-C | 2.4 GHz | 1 | 1 | 5 GHz |
| STA5 | MAC-D | PVR | Video | SSID-D | 2.4 GHz | 1 | 0 | 2.4GHz |

FIG. 16

| Terminal | MAC | Device Type | Category | SSID | Band | Channel | 5 GHz Flg | Old Band |
|---|---|---|---|---|---|---|---|---|
| STA2 | MAC-A | Television | Video | SSID-A | 5 GHz | 36 | 1 | — |
| STA3 | MAC-B | PVR | Video | SSID-A | 5 GHz | 36 | 1 | — |
| STA4 | MAC-C | PC | Best Effort | SSID-C | 5 GHz | 36 | 1 | — |
| STA5 | MAC-D | PVR | Video | SSID-B | 2.4 GHz | 1 | 0 | — |

FIG. 18

| Terminal | MAC | Device Type | Category | SSID | Band | Channel | 5 GHz Flg | Old Band |
|---|---|---|---|---|---|---|---|---|
| STA2 | MAC-A | Television | Video | SSID-A | 5 GHz | 36 | 1 | 5 GHz |
| STA3 | MAC-B | PVR | Video | SSID-A | 5 GHz | 36 | 1 | 5 GHz |
| STA4 | MAC-C | PC | Best Effort | SSID-C | 2.4 GHz | 1 | 1 | 5 GHz |
| STA5 | MAC-D | PVR | Video | SSID-B | 2.4 GHz | 1 | 0 | 2.4 GHz |

ACCESS POINT TERMINAL, WIRELESS COMMUNICATION TERMINAL, WIRELESS COMMUNICATION SYSTEM, WIRELESS COMMUNICATION METHOD, PROGRAM AND INTEGRATED CIRCUIT

CROSS REFERENCE TO RELATED APPLICATION(S)

This is a continuation application of PCT Patent Application No. PCT/JP2011/003531 filed on Jun. 21, 2011, designating the United States of America, which is based on and claims priority of Japanese Patent Application No. 2010-141045 filed on Jun. 21, 2010. The entire disclosures of the above-identified applications, including the specifications, drawings and claims are incorporated herein by reference in their entirety.

BACKGROUND OF THE INVENTION (1) Field of the Invention

The present invention relates to information processing techniques, and particularly to an information processing technique that enables efficient use of a band in wireless communication.

(2) Description of the Related Art

In recent years, many devices which can be used with wireless LANs are commercialized and it is possible to use various applications with ease and convenience. Furthermore, it is known that the advent of Institute of Electrical and Electronics Engineers (IEEE) 802.11n has allowed a faster and more stable wireless communication, and thus, for example, streaming of a high-image-quality video can be performed at home using Digital Living Network Alliance (DLNA).

However, as the number of wireless LAN devices increases, there are cases where a user cannot execute a service smoothly because a band available for a wireless LAN device is overwhelmed. Furthermore, in a 2.4 GHz band, there is a problem that radio wave interference frequently occurs when the band is used by various devices, because the 2.4 GHz band is an Industry Science Medical (ISM) band.

Therefore, in general, a 5 GHz band with less interference is used for a wireless signal that requires high real-timeliness, such as that for video. In contrast, the 2.4 GHz band is sufficient for use in content downloading or web browsing. However, if all terminals are connected through the 5 GHz band as there is less interference, the 5 GHz band becomes overwhelmed, which is like putting the cart before the horse. Therefore, it is preferable to determine which of the 2.4 GHz band and the 5 GHz band to use, depending on the level of real-timeliness required for the wireless communication.

As a technique for using such wireless bands efficiently, there is known a line acquisition method for a wireless IP phone service using a wireless LAN that controls the wireless band, by (i) controlling wireless IP phones connected to SSIDs in an integrated manner as shown in FIG. 25 and (ii) restricting a communication traffic volume to be equal to or less than a threshold set for SSIDs of an access point terminal (see Patent Literature 1: Japanese Unexamined Patent Application Publication No. 2007-214657).

However, with the effective usage of wireless LAN band in the line acquisition method having the configuration described above, the communication traffic volume per se is restricted equally for all of the terminals. Therefore, a band is unnecessarily allocated to a terminal which is not requiring a band, which makes it impossible to properly allocate a band for a terminal which is requiring a band. Furthermore, restricting a communication traffic volume is not always effective, since in general a wireless band cannot be quantitatively manipulated.

The present invention has been conceived in view of the above-described conventional problems and aims to provide an access point terminal capable of improving an efficiency in use of the wireless band, by moving a terminal to an appropriate operating frequency without controlling the communication traffic volume.

SUMMARY OF THE INVENTION

An access point terminal according to an aspect of the present invention performs wireless communication with each of a plurality of wireless communication terminals, using one of a plurality of frequency bands. Specifically, the access point terminal includes: a communication-terminal-status determination unit which determines a communication status of one wireless communication terminal out of the wireless communication terminals, by obtaining a wireless signal transmitted or received by the one wireless communication terminal; and a frequency control unit which uses (i) a first frequency band for the wireless communication with the one wireless communication terminal and (ii) a frequency band other than the first frequency band for the wireless communication with one or more of the wireless communication terminals other than the one wireless communication terminal, when the communication-terminal-status determination unit determines that the communication status of the one wireless communication terminal satisfies a predetermined condition.

The above configuration allows, for example, to allocate (i) the first frequency band to the one wireless communication terminal requiring high real-timeliness in the wireless communication and (ii) the frequency band other than the first frequency band to other terminals, which enables a proper and efficient allocation of the frequency bands depending on the intended use.

As an aspect, the access point terminal may further include an SSID issuance management unit which assigns an SSID to each of the wireless communication terminals requesting a start of wireless communication, the SSID being unique to each of the wireless communication terminals. This allows the one wireless communication terminal to occupy the first frequency band when a communication status satisfies the predetermined condition.

As another aspect, the access point terminal may further include an SSID issuance management unit which assigns an SSID to each of the wireless communication terminals requesting a start of wireless communication, the SSID being unique to each of categories to which the wireless communication terminals belong. This allows all of the wireless communication terminals that belong to a specific category to communicate wirelessly using the first frequency band.

The access point terminal may further include a communication terminal management unit which holds, for each of the wireless communication terminals, (i) the SSID assigned to the wireless communication terminal and (ii) a channel in a frequency band currently being used for the wireless communication with the wireless communication terminal, such that the SSID and the channel are associated with each other. The frequency control unit may switch between frequency bands to be used in the wireless communication with the wireless communication terminal, by changing the association between the SSID and the channel held in the communication terminal management unit.

The communication terminal management unit may further hold, for each of the wireless communication terminals, a frequency band which has been used immediately before the frequency band currently being used. When the communication-terminal-status determination unit determines that the communication status of the one wireless communication terminal has changed from a status that satisfies the predetermined condition to a status that does not satisfy the predetermined condition, the frequency control unit may switch, to the first frequency band, a frequency band of a wireless communication terminal which is (i) currently using the frequency band other than the first frequency band and (ii) has used the first frequency band immediately before, the wireless communication terminal being included in the wireless communication terminals managed by the communication terminal management unit.

As an aspect, the communication-terminal-status determination unit may determine, as the communication status, a traffic volume of a wireless signal transmitted or received by each of the wireless communication terminals that belong to a specific category that requires real-timeliness in the wireless communication. When the communication-terminal-status determination unit determines that the traffic volume of the wireless signal transmitted or received by one of the wireless communication terminals that belong to the specific category is greater than a predetermined threshold, the frequency control unit may use (i) the first frequency band for the wireless communication with the wireless communication terminals that belong to the specific category, and (ii) the frequency band other than the first frequency band for the wireless communication with the wireless communication terminal other than the wireless communication terminals that belong to the specific category.

As another aspect, when each of the wireless communication terminals transmits and receives the wireless signal that includes information indicating a priority of the wireless signal, the communication-terminal-status determination unit may determine, as the communication status, the priority of the wireless signal transmitted or received by each of the wireless communication terminals that belong to the specific category that requires real-timeliness in the wireless communication. When the communication-terminal-status determination unit determines that the priority of the wireless signal transmitted or received by one of the wireless communication terminals that belong to the specific category is greater than a predetermined threshold, the frequency control unit may use (i) the first frequency band for wireless communication with the wireless communication terminals that belong to the specific category and (ii) the frequency band other than the first frequency band for the wireless communication with one or more of the wireless communication terminals other than the wireless communication terminals that belong to the specific category.

Furthermore, the communication-terminal-status determination unit may determine that the communication status of the one wireless communication terminal satisfies the predetermined condition, when an application execution notification is received from the one wireless communication terminal, the application execution notification indicating that execution of an application requiring the real-timeliness higher than a predetermined value in the wireless communication has started.

Moreover, the communication-terminal-status determination unit may determine that the communication status of the one wireless communication terminal has changed from a status that satisfies the predetermined condition to a status that does not satisfy the predetermined condition, when an application completion notification is received from the one wireless communication terminal, the application completion notification indicating that the execution of the application requiring the real-timeliness higher than the predetermined value in wireless communication is completed.

The wireless communication terminal according to an aspect of the present invention is one wireless communication terminal out of a plurality of wireless communication terminals which perform wireless communication with an access point terminal using one of a plurality of frequency bands. Specifically, the wireless communication terminal includes: an application control unit which executes an application which requires wireless communication with the access point terminal; an application determination unit which determines real-timeliness in the wireless communication required for the application executed by the application control unit; and an application information notification unit which causes, when the real-timelimess determined by the application determination unit is greater than a predetermined threshold, the access point terminal to use (i) a first frequency band for wireless communication with the one wireless communication terminal and (ii) a frequency band other than the first frequency band for wireless communication with one or more of the wireless communication terminals other than the one wireless communication terminal, by transmitting an application execution notification to the access point terminal.

The above configuration allows to allocate (i) the first frequency band to a wireless communication terminal, at a time when the application requiring high real-timeliness in the wireless communication is executed, and (ii) frequency bands other than the first frequency band to other terminals, which enables a proper and efficient allocation of the frequency bands depending on the intended use.

Furthermore, when the execution of the application that has been executed by the application control unit is completed, the application information notification unit may further cause the access point terminal to return a frequency band of a wireless communication terminal that has had the frequency band switched according to the application execution notification back to the frequency band used prior to the switching, out of the wireless communication terminals, by transmitting an application completion notification to the access point terminal.

The wireless communication system according to an aspect of the present invention includes a plurality of wireless communication terminals and an access point terminal which perform wireless communication using one of a plurality of frequency bands. One wireless communication terminal out of the wireless communication terminals includes: an application control unit which executes an application which requires the wireless communication with the access point terminal; an application determination unit which determines real-timeliness in the wireless communication required for the application executed by the application control unit; and an application information notification unit which transmits an application execution notification to the access point terminal, when the real-timelimess determined by the application determination unit greater than the predetermined threshold. The access point terminal includes: a communication-terminal-status determination unit which determines a communication status of the one wireless communication terminal, by receiving the application execution notification; and a frequency control unit which uses (i) a first frequency band for the wireless communication with the one wireless communication terminal and (ii) a frequency band other than the first frequency band for the wireless communication with one or more of the wireless communication terminals other than the one wireless communication terminal, when the communication-terminal-status determination unit determines that the communication status of the one wireless communication terminal satisfies a predetermined condition.

A method of wireless communication according to an aspect of the present invention is a method of performing wireless communication with each of a plurality of wireless communication terminals, using one of a plurality of frequency bands. Specifically, the method includes: determining a communication status of one wireless communication terminal out of the wireless communication terminals, by obtaining a wireless signal transmitted or received by the one wireless communication terminal; and using (i) a first frequency band for the wireless communication with the one wireless communication terminal and (ii) a frequency band other than the first frequency band for the wireless communication with one or more of the wireless communication terminals other than the one wireless communication terminal, when it is determined in the determining that the communication status of the one wireless communication terminal satisfies a predetermined condition.

A method of wireless communication according to other aspects of the present invention is performed by one wireless communication terminal out of a plurality of wireless communication terminals which perform the wireless communication with an access point terminal, using one of a plurality of frequency bands. Specifically, the method includes: executing an application which requires the wireless communication with the access point terminal; determining real-timeliness in the wireless communication required for the application executed in the executing; and using (i) a first frequency band for the wireless communication with the one wireless communication terminal and (ii) a frequency band other than the first frequency band for the wireless communication with one or more of the wireless communication terminals other than the one wireless communication terminal, when it is determined in the determining that the communication status of the one wireless communication terminal is greater than a predetermined threshold.

A non-transitory computer-readable recording medium for use in a computer according to an aspect of the present invention is recorded with a program for causing the computer to perform wireless communication with each of a plurality of wireless communication terminals, using one of a plurality of frequency bands. Specifically, the program causes the computer to execute: determining a communication status of one wireless communication terminal out of the wireless communication terminals, by obtaining a wireless signal transmitted or received by the one wireless communication terminal; using (i) a first frequency band for the wireless communication with the one wireless communication terminal and (ii) a frequency band other than the first frequency band for the wireless communication with one or more of the wireless communication terminals other than the one wireless communication terminal, when it is determined in the determining that the communication status of the one wireless communication terminal satisfies a predetermined condition.

A non-transitory computer-readable recording medium for use in a computer according to other aspects of the present invention is recorded with a program for causing one wireless communication terminal out of a plurality of wireless communication terminals which perform wireless communication with an access point terminal to perform the wireless communication with the access point terminal, using one of a plurality of frequency bands. Specifically, the program causes the one wireless communication terminal to execute: executing an application which requires the wireless communication with the access point terminal; determining real-timeliness in the wireless communication required for the application executed in the executing; and causing, when it is determined in the determining that the real-timeliness is greater than the predetermined threshold, the access point terminal to use (i) a first frequency band for the wireless communication with the one wireless communication terminal, and (ii) a frequency band other than the first frequency band for the wireless communication with one or more of the wireless communication terminals other than the one wireless communication terminal, by transmitting an application execution notification to the access point terminal.

An integrated circuit according to an aspect of the present invention performs wireless communication with each of a plurality of wireless communication terminals, using one of a plurality of frequency bands. Specifically, the integrated circuit includes: a communication-terminal-status determination unit which determines a communication status of one wireless communication terminal out of, the wireless communication terminals, by obtaining a wireless signal transmitted or received by the one wireless communication terminal; and a frequency control unit which uses (i) a first frequency band for the wireless communication with the one wireless communication terminal and (ii) a frequency band other than the first frequency band for the wireless communication with one or more of the wireless communication terminals other than the one wireless communication terminal, when the communication-terminal-status determination unit determines that the communication status of the one wireless communication terminal satisfies a predetermined condition.

An integrated circuit according to other aspects of the present invention is provided on one wireless communication terminal out of a plurality of wireless communication terminals which perform wireless communication with an access point terminal, using one of a plurality of frequency bands. Specifically, the integrated circuit includes: an application control unit which executes an application which requires the wireless communication with the access point terminal; an application determination unit which determines real-timeliness in the wireless communication required for the application executed by the application control unit; and an application information notification unit which causes, when the real-timeliness determined by the application determination unit is greater than the predetermined threshold, the access point terminal (i) to use a first frequency band for the wireless communication with the one wireless communication terminal, and (ii) to use a frequency band other than the first frequency band for the wireless communication with one or more of the wireless communication terminals other than the one wireless communication terminal, by transmitting an application execution notification to the access point terminal.

The present invention enables, for example, to (i) focus on a wireless communication terminal which executes an application requiring high real-timeliness in wireless communication, and (ii) allocate a first frequency band with less radio wave interference (for example, the 5 GHz band) to the wireless communication terminal, thereby provide a wireless LAN environment appropriate for the usage of the wireless communication terminal.

BRIEF DESCRIPTION OF THE DRAWINGS

These and other objects, advantages and features of the invention will become apparent from the following description thereof taken in conjunction with the accompanying drawings that illustrate specific embodiments of the present invention. In the Drawings:

FIG. 5 shows data structure of a device information transmission signal;

FIG. 6 shows a "Primary Device Type" of the device information transmission signal;

FIG. 7A shows an example of a supported frequency band, included in device information transmission signal received from each of the wireless communication terminals;

FIG. 7B shows an example of a desired frequency band, included in the device information transmission signal received by each of the wireless communication terminals;

FIG. 8A shows an example of a conversion table which holds (i) a Primary Device Type and (ii) an operation frequency, of a wireless communication terminal, such that the Primary Device Type and the operation frequency are associated with each other;

FIG. 8B shows an example of the operation frequency allocated to each of the wireless communication terminals, based on the conversion table in FIG. 8A;

FIG. 9A shows an example of a conversion table which holds (i) a category and (ii) the operation frequency, of a wireless communication terminal, such that the category and the operation frequency are associated with each other;

FIG. 12 shows an example of the communication start request signal and an interference state for each of the frequency bands;

FIG. 13 shows an example of communication terminal information held by the access point terminal according to the first embodiment of the present invention;

FIG. 15 shows an example of the communication terminal information after the transfer of SSID held by the access point terminal according to the first embodiment of the present invention is moved;

FIG. 16 shows an example of the communication terminal information held by the access point terminal according to an second embodiment of the present invention;

FIG. 18 shows an example of the communication terminal information after the transfer of the SSID, held by the access point terminal according to the second embodiment of the present invention;

DESCRIPTION OF THE PREFERRED EMBODIMENTS

Embodiments of the present invention are described below with reference to drawings.

First Embodiment

First, a configuration diagram of a wireless LAN system according to a first embodiment is described. The wireless LAN system according to the first embodiment includes an access point terminal 1 (hereinafter referred to as AP) and wireless communication terminals 2 to 5 (hereinafter referred to as STA). The STA2 to the STA5 are connected using an infrastructure mode and communicate under a control of the AP1. The number of the STAs is 4 in the first embodiment, however, it goes without saying that it is not limited to the number.

Furthermore, the STA2 to the STA5 are connected with the AP1 using Wi-Fi Protected Setup (WPS), which is an easy setup for wireless LAN advocated by Wi-Fi Alliance (WFA). It goes without saying that, without being limited to WPS, other easy connections for wireless LAN may be used, such as the easy connection which (i) enables an automatic key exchange between the AP1 and each of the STA2 to the STA5, and (ii) allows the AP1 to distribute connection information to the STA2 to the STA5.

Furthermore, it is assumed that the AP1 is a device which is capable of concurrently operating in frequency bands (for example, in the 2.4 GHz band and the 5 GHz band). Furthermore; although the 2.4 GHz band and the 5 GHz band include channels, it is assumed that the AP1 according to this embodiment performs (i) wireless communication in the 2.4 GHz band through a channel 1 (1ch) and (ii) the wireless communication in the 5 GHz band through a channel 36 (36ch). Furthermore, the STA2 to the STA4 are devices capable of (i) selecting one of the 2.4 GHz band and the 5 GHz band and (ii) connecting to a channel in a frequency band in which the AP1 is operating. Meanwhile, the STA5 is assumed to be a device which operates only in the 2.4 GHz band.

When WPS is performed between the AP1, the STA2 to the STA4 are connected with the AP1 in the 5 GHz band that is with less interference. The STA5 is connected with the AP1 in the 2.4 GHz band, because the STA5 does not support the 5 GHz band.

The STA2 to the STA5 communicate under the control of the AP1, and are capable of executing various applications. For example, the STA2 to the STA5 are capable of (i) executing services from the Internet via the AP1 and (ii) executing applications such as DLNA among the STAs.

Next, the configuration of the AP1 is described with reference to FIG. 2.

Figure 2:
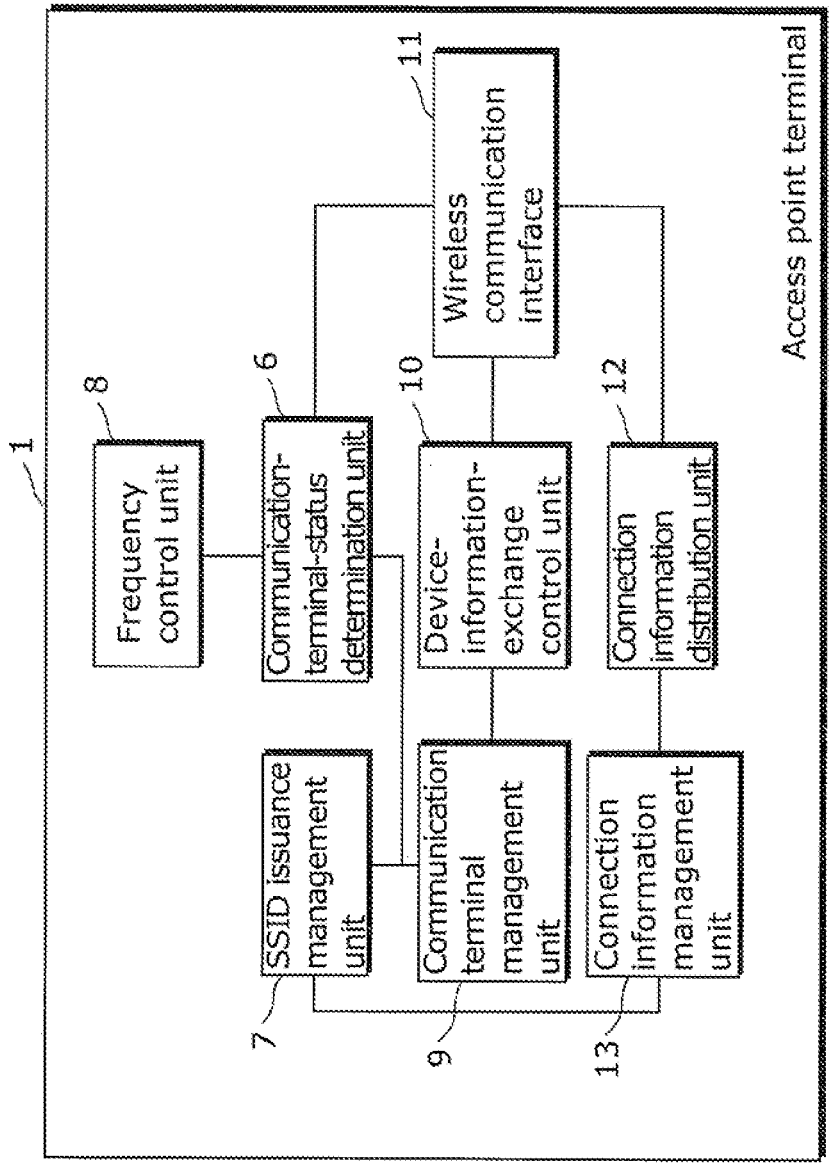
FIG. 2 is a functional block diagram of an access point terminal according to the first embodiment of the present invention.

The AP1 includes, as shown in FIG. 2, a wireless communication interface 11, a device-information-exchange control unit 10, a connection information distribution unit 12, a connection information management unit 13, a communication terminal management unit 9, an SSID issuance management unit 7, a communication-terminal-status determination unit 6, and a frequency control unit 8.

The wireless communication interface 11 is an interface for transmitting and receiving a wireless signal between the wireless communication terminals. That is, the wireless communication interface 11 transmits, as a wireless signal, data generated by the device-information-exchange control unit 10, the connection information distribution unit 12, or the like, to each of the STA2 to the STA5. Furthermore, the wireless communication interface 11 generates data from a wireless signal received from the STA2 to the STA5, and notifies the generated data to the communication-terminal-status determination unit 6, the device-information-exchange control unit 10, or the like. Furthermore, the wireless communication interface 11 measures a received power of the received wireless signal, or a reception state, such as an interference state, of each of the frequency bands. Moreover, the wireless communication interface 11 transmits, in a predetermined time interval, a beacon signal to each of the wireless communication terminals managed by the communication terminal management unit 9.

The beacon signal includes a Service Set Identifier (SSID) which is assigned to a destination wireless communication terminal, and is transmitted using the frequency band used for wireless communication with the wireless communication terminal. The SSID of each of the wireless communication terminals and the frequency band to be used by each of the wireless communication terminals are held by the communication terminal management unit 9.

The device-information-exchange control unit (device information obtaining unit) 10 exchanges the device information between the wireless communication terminals which newly request a start of the wireless communication. That is, the device-information-exchange control unit 10 (i) transmits the device information of the AP1 to the communication terminal which newly requests a start of the wireless communication and (ii) obtains the device information of the communication terminal which newly requests the start of the wireless communication.

The connection information management unit 13 holds information required by the wireless communication terminal for performing the wireless communication with the AP1. Specifically, the connection information management unit 13 holds key information for coding and decoding the wireless signal. In a description on an example below, it is assumed that the connection information management unit 13 holds the key information in the 5 GHz band (the first frequency band) and the key information in the 2.4 GHz band (the frequency band other than the first frequency band). It is to be noted that the description below is based on an assumption that the first frequency band is the 5 GHz band and the frequency band other than the first frequency band is the 2.4 GHz band, however, the present invention is not limited to the above. That is, it is sufficient when the first and the second frequency bands are frequency bands different from each other. Typically, the first frequency band is a frequency band which is higher than the other frequency band and with less interference, however, the present invention is not limited to the above. Furthermore, the frequency band may be equal to or more than three.

The connection information distribution unit 12 transmits the connection information (key information) held by the connection information management unit 13 to the wireless communication terminal which newly requests a start of the wireless communication. It is to be noted that a method of selecting the connection information to be transmitted is not specifically limited and, for example, the following method may be used.

For example, the connection information distribution unit 12 may distribute, to the wireless communication terminal, all the connection information held by the connection information management unit 13 to cause the wireless communication terminal to select which connection information (that is, which frequency band) to use for the wireless communication. Alternatively, the connection information distribution unit 12 may transmit only the connection information associated with the frequency band used for the WPS process. Moreover, when the obtained device information includes information indicating one or more frequency bands supported by the wireless communication terminal, the connection information distribution unit 12 may transmit only the connection information associated with single frequency band selected from the one or more frequency bands.

The communication terminal management unit 9 holds information of each of the wireless communication terminals performing wireless communication between the AP1. For example, the communication terminal management unit 9 holds (i) the SSID assigned to the wireless communication terminal and (ii) the frequency band being used for the wireless communication between the wireless communication terminals, such that the SSID and the frequency band is associated with each other. Details are described later using FIG. 13.

The SSID issuance management unit 7 assigns an SSID to the wireless communication terminal which newly requests a start of the wireless communication. Regarding the method of assigning the SSID, for example, the SSID issuance management unit 7 may assign a unique SSID to (i) each of the wireless communication terminals, (ii) each of the categories to which the wireless communication terminals belong, or (iii) each of the channels which the wireless communication terminals use.

The communication-terminal-status determination unit 6 determines the communication status of each of the wireless communication terminals by obtaining the wireless signal transmitted and received by each of the wireless communication terminals, where the communication status includes a volume or a quality of the communication.

As an example of the volume of the communication, the traffic volume of the wireless signal is raised. Furthermore, as an example of the quality of the communication, priority included in the wireless signal, more specifically, a Type of Service (ToS) or a DiffServ Code Point (DSCP) included in an IP header is raised.

Moreover, the communication-terminal-status determination unit 6 may determine (i) that the communication status satisfies a condition, when an application execution notification is received, and (ii) that the communication status has changed from a status that satisfies the condition to a status that does not satisfy the condition, when the application completion notification is received, where the application execution notification indicates that the execution of the application requiring higher real-timeliness than a predetermined value in wireless communication has started, and the application completion notification indicates that the execution of the application requiring the higher real-timeliness than a predetermined value in wireless communication is completed.

The frequency control unit 8 performs a process of switching between the frequency bands for use in the wireless communication with each of the wireless communication terminals, according to the communication status and so forth. For example, when the communication-terminal-status determination unit 6 determines that the communication status of the wireless communication terminal satisfies a predetermined condition, the frequency control unit 8 uses the first frequency band for the wireless communication with the wireless communication terminal, and uses the frequency band other than the first frequency band for the wireless communication with other communication terminals assigned with the SSID different from the wireless communication terminal.

Specifically, the frequency control unit 8 is capable of switching the frequency bands for use in the wireless communication with the wireless communication terminal assigned with the SSID, by changing the association between the SSID and the frequency band held by the communication terminal management unit 9.

Figure 3:
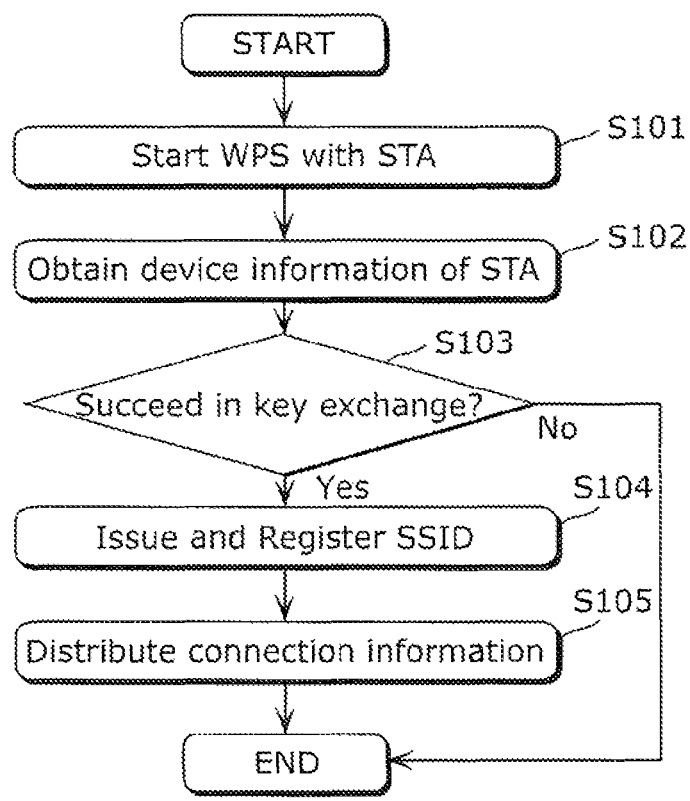
FIG. 3 is a flowchart of an operation of the access point terminal according to the first embodiment of the present invention.
Figure 4:
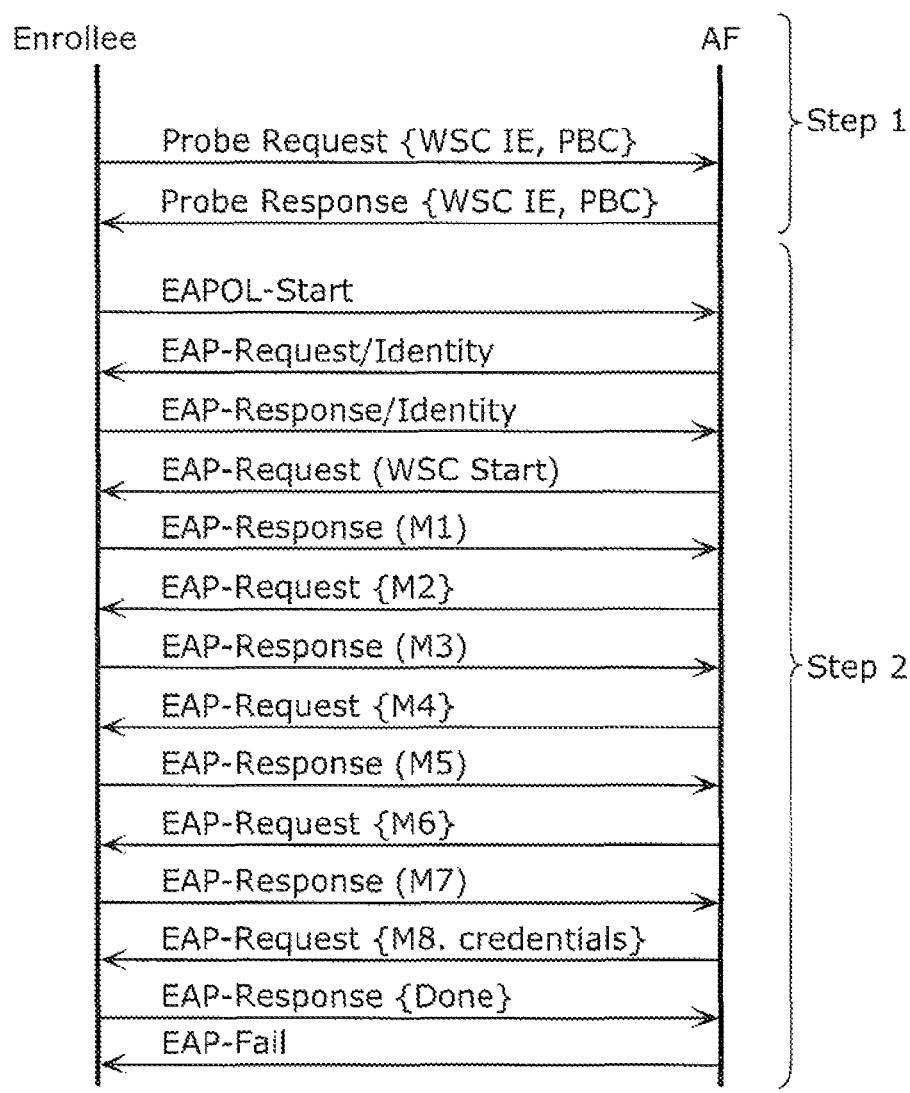
FIG. 4 is a sequence diagram between the access point terminal and a wireless communication terminal in a connection information distribution process.

Next, an operation of the AP1 when the start of the wireless communication is requested from the STA2 is described with reference to FIGS. 3 and 4. FIG. 3 is a flowchart showing steps of a connection information distribution process. FIG. 4 is a sequence diagram between the AP1 and the STA2 in the connection information distribution process. It is to be noted that the AP1 operates in the same manner as the above when the start of the wireless communication is requested from the STA3 to the STA5.

First, the AP1 receives an instruction from a user indicating that WPS is to be started between the STA2 (S101). Specifically, upon a press of a button (WPS start button) provided on each of the AP1 and the STA2, the STA2 transmits a communication start request signal (Probe Request) to the AP1.

This is a process in which the STA2 searches the AP1, which is to be the communication partner, and corresponds to the step 1 shown in FIG. 4. Specifically, the STA2 transmits the communication start request signal to all of the channels in the 5 GHz band and all of the channels in the 2.4 GHz band.

Meanwhile, the AP1 (i) receives a communication start request signal from a channel that the AP1 uses, out of the communication start request signals transmitted from the STA2 in the 5 GHz band, and (ii) transmits a communication start response signal (Probe Response) to the STA2. In the same manner, the AP1 (i) receives a communication start request signal from a channel that the AP1 uses, out of the communication start request signals transmitted from the STA2 in the 2.4 GHz band, and (ii) transmits a communication start response signal to the STA2. It is to be noted that the communication start request signal and the communication start response signal associated with each other are transmitted and received using the same frequency band and the same channel.

Here, when the WPS start button provided on the AP1 has been pressed, the AP1 transmits the communication start response signal having a PBC flag indicating that the WPS start button is pressed. Meanwhile, the STA2 (i) determines that the AP1 which is the source of the communication start response signal having the PBC flag is the communication partner, and (ii) executes the step 2 shown in FIG. 4 between the AP1.

In the step 2 shown in FIG. 4, a message complying with an Extensible Authentication Protocol over LAN (EAPOL) is transmitted and received between the AP1 and the STA2. Here, detailed description on the overall EAPOL is omitted to focus on some part of the EAPOL closely related to the present invention.

The device-information-exchange control unit 10 of the AP1 obtains device information of the STA2 (S102), by exchanging the device information with the STA2, the device information being required for distributing the connection information (S102). The obtained device information is held for each of the STA2 to the STA5 by the communication terminal management unit 9, as shown in FIG. 13. Specifically, the STA2 (i) includes various information of the STA2 into a device information transmission signal (M1 message) and (ii) transmits the signal to the AP1. FIG. 5 and FIG. 6 show a data structure of the device information transmission signal. It goes without saying that the device information transmission signal does not necessarily be the M1 message and may be a message transmitted from the STA.

The device information transmission signal includes, for example, a Universally Unique Identifier (uuid) which is uniquely assigned to each device, and a device type (Primary Device Type). The Primary Device Type is specified, for example, as shown in FIG. 6, by a combination of (i) a Category which includes "Computer", "Displays", "Multimedia Devices", and so forth, and (ii) a Sub Category resulting from dividing each Category into "Television", "Personal Video Recorder (PVR)", and so forth.

Furthermore, in this embodiment, (i) a new item ("New Field" in FIG. 5) may be added to the conventional device information transmission signal, and (ii) information such as "category", "supported frequency band", and "desired frequency band" may be set to the new item. It is to be noted that such items are not mandatory and may be omitted.

As specific examples of Category, "Voice", "Video", "BestEffort", "Back Ground", and so forth are raised. To the supported frequency band, information for specifying one or more frequency bands (2.4 GHz band and 5 GHz band) with which the STA2 is capable of performing wireless communication is set. To the desired frequency band, information for specifying a frequency band (the 2.4 GHz band or the 5 GHz band) is set, where the frequency band is desired for use in the wireless communication with the AP1 by the STA2.

After obtaining such device information of the STA2, the device-information-exchange control unit 10 of the AP1 executes a predetermined key exchange (S103) according to the WPS standard. A key to be exchanged here is a temporal key for coding and decoding the connection information distributed in S105, and an actual key for coding and decoding the wireless signal is included in the connection information.

When the predetermined key exchange is completed normally (Yes in D103), the SSID issuance management unit 7 of the AP1 issues an SSID to the STA2 and registers the SSID with the connection information management unit 13 (S104). It is to be noted that the SSID issuance management unit 7 in the first embodiment assigns a unique SSID to each of the STA2 to the STA5. Furthermore, the assigned SSID and the associated device information of the STA2 obtained by the device-information-exchange control unit 10 are held by the communication terminal management unit 9.

Subsequently, the connection information distribution unit 12 of the AP1 distributes, to the STA2, the connection information for connecting to the AP1, along with the SSID assigned to the STA2 (S105). Specifically, the AP1 (i) includes the connection information, including the SSID, into connection information distribution signal (M8 message) and (ii) transmits the connection information distribution signal to the STA2. This method allows to assign a different SSID to each of the STA2 to the STA5.

Here, the AP1 (i) allocates a channel (operation frequency) in the 5 GHz band or the 2.4 GHz band to the STA2 to the STA5 which are the sources of the communication start request signal, and (ii) distributes the connection information associated with the allocated channel. Specifically, the AP1 allocates the channel based on the supported frequency information (which is the "supported frequency band", the "desired frequency band", the "Primary Device Type", and the "category" described below) received from each of the STA2 to the STA5. A process of allocating the channel, to be performed by the AP1, is described in detail below, with reference to FIG. 7A to FIG. 12.

As a first method of allocation, the AP1 is capable of allocating the channel based on the "supported frequency band" included in the device information transmission signal received by each of the STA2 to the STA5. It is to be noted that the supported frequency band is an item to which one or more frequency bands are set, where the one or more frequency bands are the frequency bands in which the wireless communication terminal is capable of performing wireless communication. The wireless communication terminal in this embodiment sets all the frequency bands the wireless communication terminal supports as the supported frequency bands.

For example, FIG. 7A shows an example of the supported frequency band included in the device information transmission signal received from the STA2 to the STA5. In FIG. 7A, "1" indicates that the frequency band is supported, and "0" indicates that the frequency band is not supported. Furthermore, a column enclosed in a thick-frame shows a frequency band to which the channel allocated to each of the wireless communication terminals belongs.

As shown in FIG. 7A, the AP1 allocates the channel in the 5 GHz band to the STA2 and the STA3 which support both of the 2.4 GHz band and the 5 GHz band. Furthermore, the AP1 allocates the channel in the 5 GHz band to the STA4 which only supports the 5 GHz band. Furthermore, the AP1 allocates the channel in the 2.4 GHz band to the STA5 which only supports the 2.4 GHz band. That is, in the example shown in FIG. 7A, the AP1 allocates (i) the channel in the 5 GHz band to the wireless communication terminal supporting the 5 GHz band, and (ii) the channel in the 2.4 GHz band to the wireless communication terminal not supporting the 5 GHz band.

Furthermore, as a second method of allocation, the AP1 is capable of allocating the channel based on the "desired frequency band" included in the device information transmission signal received by each of the STA2 to the STA5. It is to be noted that the desired frequency band is an item to which a frequency band is set, where the frequency band is desired, by the STA, for use in the wireless communication with the AP1. The wireless communication terminal in this embodiment may set, as the desired frequency band, (i) a predetermined frequency band or (ii) a frequency band which has the best reception state (received power or the interference state described later).

For example, FIG. 7B shows an example of the desired frequency band included in the device information transmission signal received from the STA2 to the STA5. In FIG. 7B, "1" indicates that the wireless communication terminal desires to use the frequency band. Furthermore, a column enclosed in a thick-frame shows a frequency band to which the channel allocated to each of the wireless communication terminals belongs.

As shown in FIG. 7B, the AP1 allocates the channel in the 5 GHz band to the STA2 to the STA4 which desire the 5 GHz band. Meanwhile, the AP1 allocates the channel in the 2.4 GHz band to the STA5 which desires the 2.4 GHz band. That is, in the example in FIG. 7B, the AP1 allocates the channel of the frequency band desired by the wireless communication terminal.

Furthermore, as a third method of allocation, the AP1 is capable of allocating the channel based on the "Primary Device Type" (a combination of the Category and the Sub category in FIG. 6) included in the device information transmission signal received from each of the STA2 to the STA5. In this case, the AP1 needs to hold a conversion table as shown in FIG. 8A in advance. This conversion table may be held in a fixed manner or in a manner that can be changed by the user. The conversion table shown in FIG. 8A holds (i) the Primary Device Type of a wireless communication terminal and (ii) a frequency band of the channel to be allocated to the wireless communication terminal having the Primary Device Type, such that the Primary Device Type and the frequency band are associated with each other.

As shown in FIG. 8B, the AP1 allocates the channel in the 2.4 GHz band to the STA2 having "Computer" as the Category and "PC" as the Sub category. In the same manner, the AP1 (i) obtains the frequency band associated with the Primary Device Type of the STA3 to the STA5 from the conversion table shown in FIG. 8A and (ii) allocates the channel in the obtained frequency band to each of the STA3 to the STA5.

Furthermore, as a fourth method of allocation, the AP1 is capable of allocating the channel based on the "Category" included in the device information transmission signal received by each of the STA2 to the STA5. In this case, the AP1 needs to hold a conversion table as shown in FIG. 9A in advance. The conversion table shown in FIG. 9A holds (i) the Category of a wireless communication terminal and (ii) the frequency band of the channel to be allocated to the wireless communication terminal, such that the Category and the frequency band are associated with each other. This conversion table may be held in a fixed manner or in a manner that can be changed by the user.

Figures 9B, 10A:
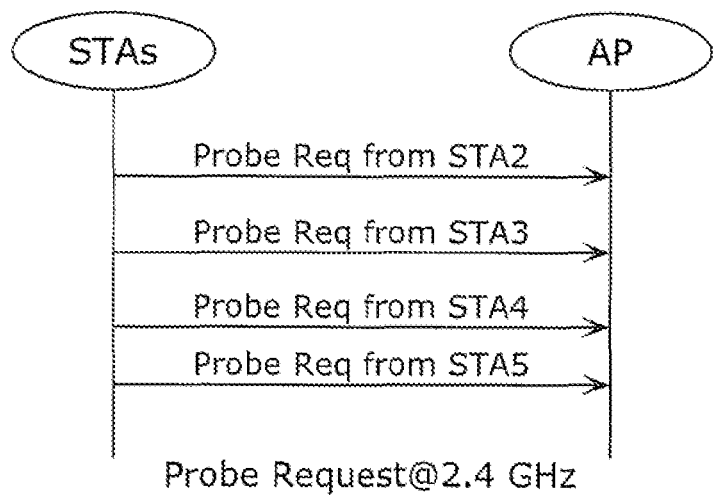
FIG. 9B shows an example of the operation frequency allocated to each of the wireless communication terminals, based on the conversion table in FIG. 9A.
FIG. 10A shows an example of a communication start request signal received by the access point terminal in a 2.4 GHz band.

As shown in FIG. 9B, the AP1 allocates the channel in the 2.4 GHz band to the STA2 having "Best Effort" as the category. In the same manner, the AP1 (i) obtains the frequency band associated with the category of the STA3 to the STA5 from the conversion table shown in FIG. 9A and (ii) allocates the channel in the obtained frequency band to each of the STA3 to the STA5.

Furthermore, as a modification example of the first method of allocation, the AP1 may obtain the supported frequency band of each of the wireless communication terminals from the communication start request signal. A method of obtaining the supported frequency band of the STA2 to the STA5 from the communication start request signal is described with reference to FIG. 10A and FIG. 10B.

As described above, the STA2 transmits the communication start request signal to all of the channels in the frequency bands which the STA2 supports. Furthermore, an identical MAC address (MAC-A) is set in all of the communication start request signals transmitted by the STA2. The same goes for the STA3 to the STA5.

Figures 10B, 11:
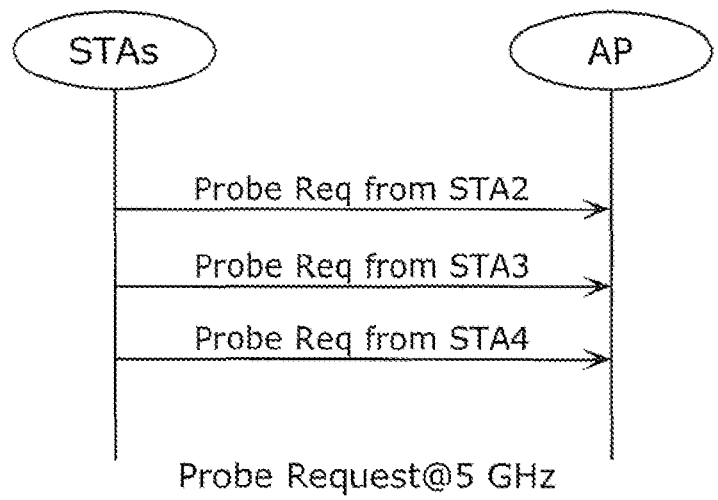
FIG. 10B shows an example of the communication start request signal received by the access point terminal in a 5 GHz band.
FIG. 11 shows an example of the communication start request signal for each of the frequency bands and a received power of each communication start request signal.

As shown in FIG. 10A and FIG. 10B, the AP1 determines that the STA2 supports both of the 2.4 GHz band and the 5 GHz band, upon receipt of the communication start request signal having the MAC-A set as the MAC address in both of the 2.4 GHz band and the 5 GHz band. The same goes for the STA3 and the STA4. Meanwhile, the AP1 determines that the STA5 supports only the 2.4 GHz band, upon receipt of the communication start request signal having the MAC-D set as the MAC address in the 2.4 GHz band only.

As described above, by knowing the supported frequency band of each of the wireless communication terminal using the communication start request signal, an advantageous effect is achieved that there is no need to add a new item to the device information transmission signal as described in the first method of allocation.

Furthermore, in addition to the modification example of the first method of allocation, the AP1 may allocate the channel by taking magnitude of the received power of the communication start request signal into consideration. It is to be noted that a "received power (dBm)" indicates a value measurable by the wireless communication interface 11 of the AP1, and includes, for example, Receive Signal Strength Indication (RSSI).

Specifically, as shown in FIG. 11, the AP1 measures the received power of the communication start request signal received from each of the STA2 to STA5, in a channel in each frequency band that the AP1 is operating. It is to be noted that the received power needs to be independently measured for all of the communication start request signals, because the RSSI fluctuates according to a positional relationship between the AP1 and each of the wireless communication terminals. In FIG. 11, "1" indicates that a communication start request signal is received in the frequency band. Furthermore, a column enclosed in a thick-frame shows the frequency band to which the channel allocated to each of the wireless communication terminals belongs.

The AP1 allocates a channel in the frequency band having the highest received power, to the wireless communication terminal which supports frequency bands. That is, as shown in FIG. 11, the AP1 allocates a channel in the 5 GHz band having the higher received power, to the STA2 which supports both of the 2.4 GHz band and the 5 GHz band. In the same manner, the AP1 allocates a channel in the 2.4 GHz band having the higher received power, to the STA3 which supports both of the 2.4 GHz band and the 5 GHz band. Meanwhile, the AP1 allocates, to the STA4 and the STA5 which support only one of the 2.4 GHz band and the 5 GHz band, the channel in the supported frequency band, regardless of the magnitude of the received power.

As described above, by allocating the channel in the frequency band having the higher received power, out of the supported frequency bands, it is possible to select the appropriate frequency band depending on a communication environment. It is to be noted that an example which is a combination of (i) the modification example of the first method of allocation and (ii) the received power has been described here, however, without being limited to this example, the same effect may be produced by combining the received power with the first method of allocation, the third method of allocation, or the fourth method of allocation.

Furthermore, in addition to the modification example of the first method of allocation, the AP1 may allocate a channel by taking the interference state of each of the frequency bands into consideration. It is to be noted that the "interference state" indicates a value measurable by the wireless communication interface 11 of the AP1, and is measurable, for example, by Packet Error Ratio (PER) of a signal (packet) received in a channel in each frequency band that the AP1 is operating. Furthermore, the PER may be calculated based on, for example, a glitch, a Cyclic Redundancy Check (CRC) of a Physical Layer Convergence Protocol (PLCP) header, or the like.

Specifically, as shown in FIG. 12, the AP1 receives the communication start request signal from each of the STA2 to the STA5 and measures the interference state of each of the frequency bands. That is, the AP1 determines that the interference state is bad (in a state where there are frequent occurrences of interference and indicated as "High" in FIG. 12), when the PER of the packet received in the 2.4 GHz band is equal to or more than a predetermined threshold. Meanwhile, the AP1 determines that the interference state is good (in a state where there are a few occurrences of interference and indicated as "Low" in FIG. 12), when the PER of a packet received in the 5 GHz band is below the predetermined threshold. It is to be noted that it is sufficient to measure the interference state based on a given signal transmitted in each of the frequency bands, which is different from the case with the received power described above. Furthermore, the threshold for each of the frequency bands may be identical or may be set individually for each of the frequency bands.

The AP1 allocates the channel in the frequency band with the interference state lower than the threshold, to the wireless communication terminal which supports frequency bands. That is, as shown in FIG. 12, the AP1 allocates the channel in the 5 GHz band with the interference state lower than the threshold, to the STA2 and the STA3 which support both of the 2.4 GHz band and the 5 GHz band. Meanwhile, the AP1 allocates, to the STA4 and the STA5 which support only one of the 2.4 GHz band and the 5 GHz band, the channel in the supported frequency band, regardless of the interference state.

As described above, by allocating the channel in the frequency band with the lower interference state, it is possible to select the channel in the appropriate frequency band depending on the communication environment. It is to be noted that an example which is a combination of (i) the modification example of the first method of allocation and the (ii) interference state has been described here, however, without being limited to this example, the same effect may be produced by combining the interference state with the first method of allocation, the third method of allocation, or the fourth method of allocation. Moreover, the received power and the interference state may be combined.

Figure 1:
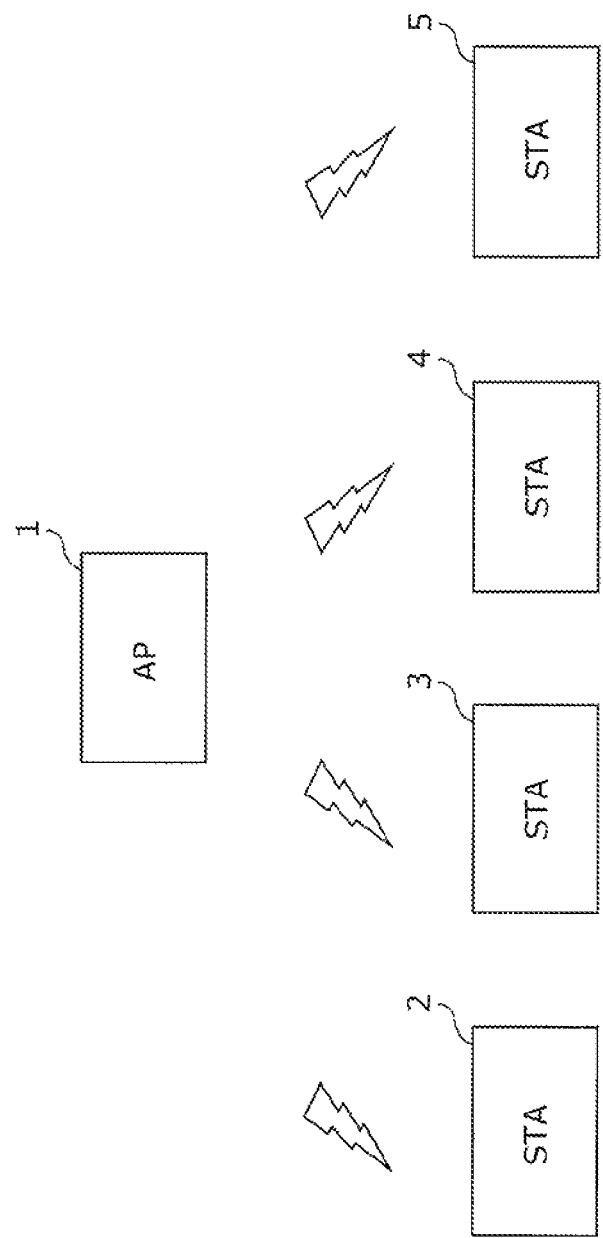
FIG. 1 is a configuration diagram of a wireless communication system according to a first embodiment of the present invention.

When all of the STA2 to the STA5 shown in FIG. 1 are connected to the AP1, the communication terminal information managed by the communication terminal management unit 9 of the AP1 is, for example, as shown in FIG. 13. It is to be noted that the "MAC" shown in FIG. 13 is information for identifying each of the STA2 to the STA5 and, for example, a MAC address may be used. The "Primary Device Type" is information included in the device information obtained from the STA2 to the STA5 (the Sub Category, in FIG. 6 in this example), and indicates a type (Television, PVR, PC, etc.) of each of the STA2 to the STA5. The "Category" indicates the real-timeliness (Video, BestEffort, etc.) required for the wireless communication in an application executed by each of the STA2 to the STA5. The "SSID" indicates the SSID issued by the SSID issuance management unit 7 to each of the STA2 to the STA5. The "Band" indicates the frequency band (the 5 GHz band or the 2.4 GHz band) currently being used for the wireless communication with each of the STA2 to the STA5. The "Channel" indicates the channel currently being used for the wireless communication with each of the STA2 to the STA5. In FIG. 13, "36" indicates the channel 36 and "1" indicates the channel 1.

The "5 GHzFlg" indicates whether or not each of the STA2 to the STA5 has experienced the wireless communication with the AP1 in the 5 GHz band (experienced: 1 and unexperienced: 0). The "OldBand" indicates the frequency band that has been used immediately before the frequency band indicated in the "Band". It is to be noted that FIG. 13 shows a state immediately after the STA2 to the STA5 are connected with the AP1, thus the "OldBand" is not registered.

As shown in FIG. 13, in the communication terminal to management unit 9, the following are registered as the communication terminal information of the STA2: "MAC-A" as the MAC; "Television" as the Primary Device Type; "Video" as the Category; "SSID-A" as the SSID; "5 GHz" as the Band; "36" as the Channel; "1" as the 5 GHzFlg; and "– (unregistered)" as the "Old band".

Furthermore, in the communication terminal management unit 9, the following are registered as the communication terminal information of the STA3: "MAC-B" as the MAC; "PVR" as the Primary Device Type; "Video" as the Category; "SSID-B" as the SSID; "5 GHz" as the Band; "36" as the Channel; "1" as the 5 GHzFlg, and "–" as the "Oldband".

Furthermore, in the communication terminal management unit 9, the following are registered as the communication terminal information of the STA4: "MAC-C" as the MAC; "PC" as the Primary Device Type; "BestEffort" as the Category; "SSID-C" as the SSID; "5 GHz" as the Band; "36" as the Channel; "1" as the 5 GHzFlg; and "–" as the "Oldband".

Furthermore, in the communication terminal management unit 9, the following are registered as the communication terminal information of the STA5: "MAC-D" as the MAC; "PVR" as the Primary Device Type; "Video" as the Category; "SSID-D" as the SSID; "2.4 GHz" as the Band; "1" as the Channel; "0" as the 5 GHzFlg; and "–" as the "Oldband". It is to be noted that the operation frequency of the STA5 is the 2.4 GHz band, since the STA5 does not support the 5 GHz band.

It is to be noted that the AP1 determines the real-timeliness required for the wireless communication in the application executed by each of the STA2 to the STA5, by referring to the Primary Device Type or the Category shown in FIG. 13. It is to be noted that both of the Primary Device Type and the Category are information which indicate a type of the wireless communication terminal.

For example, the AP1 determines that the application to be executed by the STA2, the STA3, and the STA5, all of which are having the "Television" or the "PVR" as the device information, requires the higher real-timeliness in the wireless communication than the STA4 that belongs to "PC". For example, in the conversion table shown in FIG. 8A, it is possible for the AP1 to determine that the application executed by the wireless communication terminal having the device information associated with the 5 GHz band requires the higher real-timeliness in the wireless communication than the application executed by the wireless communication terminal having the device information associated with the 2.4 GHz band.

Furthermore, the AP1 determines that the application executed by the STA2, the STA3 and the STA5, all of which belong to the "Video" category requires the higher real-timeliness in the wireless communication than the application executed by the STA4 which belongs to the "BestEffort" category. For example, in the conversion table shown in FIG. 9A, it is possible for the AP1 to determine that the application to be executed by the wireless communication terminal having the category associated with the 5 GHz band requires the higher real-timeliness in the wireless communication than the application to be executed by the wireless communication terminal having the category associated with the 2.4 GHz band.

It goes without saying that the Primary Device Type and the Category are not limited to the above examples and may be any identification information. Moreover, regarding the Category, the AP1 may uniquely categorize the wireless communication terminals based on the Primary Device Type or the like from the STA2. For example, when the Primary Device Type (the Sub Category in FIG. 6) obtained from the STA2 is the "Television" or the "PVR", in which the application requiring real-timeliness is often executed, the AP1 may determine that the Category of the STA2 is "Video". The category here is according to an access category (Voice, Video, BestEffort, and BackGround) stipulated by WiFi, however, it goes without saying that other categories may be used.

Figure 14:
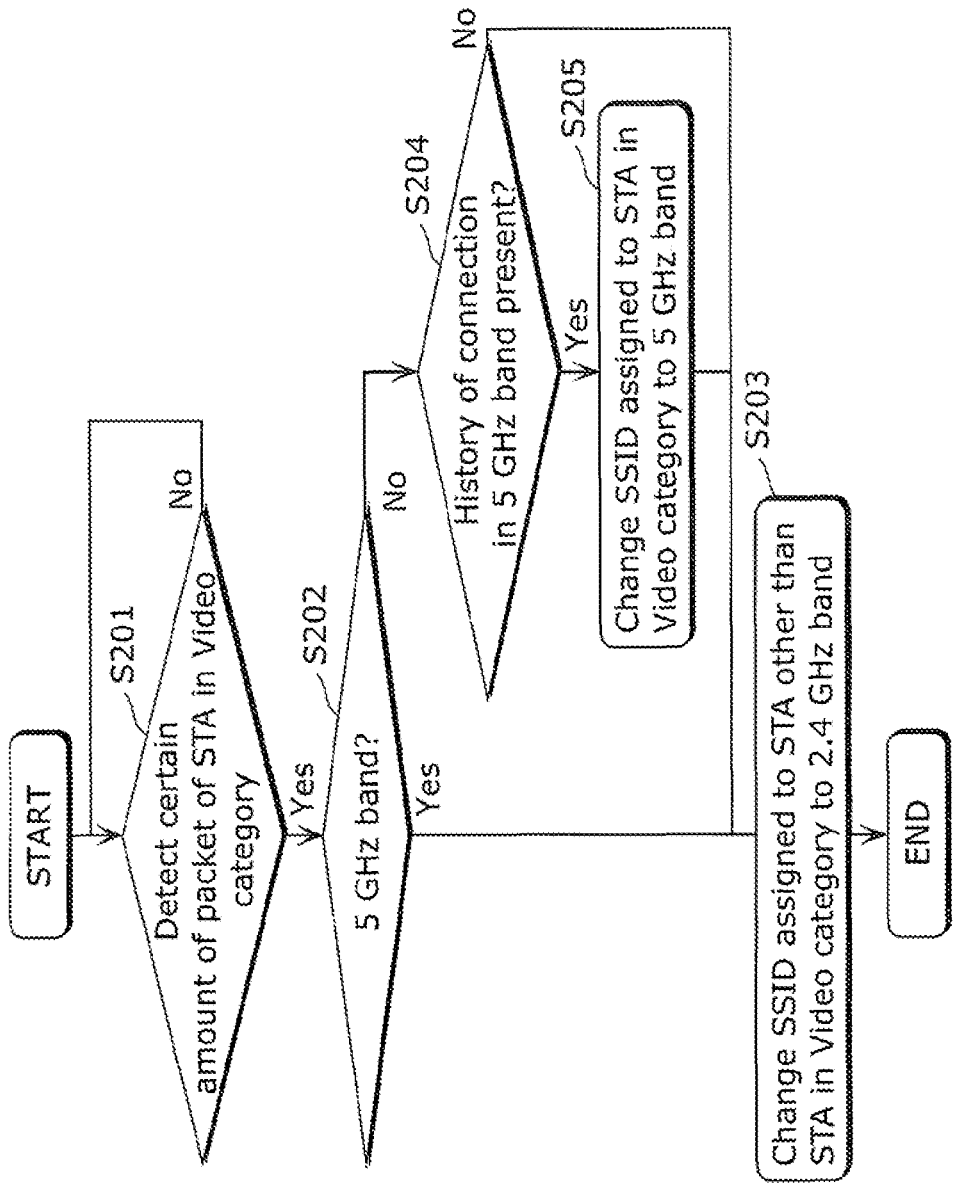
FIG. 14 is a flowchart showing a change of the SSID of the access point terminal according to the first embodiment of the present invention.

Next, an operation of the AP1 when the operation frequency of each of the STA2 to the STA5 is moved is described using the flowchart in FIG. 14. It is assumed here that, for example, the STA2 starts VoD viewing from the Internet.

The communication-terminal-status determination unit 6 of the AP1 always supervises, as an object to be detected, the communication traffic volume of the STA2, the STA3 and the STA5, all of which belong to the Video category, out of the STA2 to the STA5 managed by the communication terminal management unit 9. Specifically, the communication-terminal-status determination unit 6 detects the communication traffic volume of a frame having a source MAC address or a destination MAC address to which one of the "MAC-A", "MAC-B", or "MAC-C" is set, out of frames received by the AP1.

When the STA2 starts the VoD, the communication-terminal-status determination unit 6 of the AP1 detects, for example, that the STA2 is performing communication at a velocity greater than 5 Mbps (the threshold) (S201). Here, the following steps are described based on an assumption that the STA has started the communication greater than 5 Mbps. It is to be noted that to perform communication with a velocity (or a communication traffic volume) greater than the threshold is an example of the communication status to satisfy the predetermined condition.

It is to be noted that although the threshold has been set to 5 Mbps in S201, a specific value is not limited to this value and an appropriate value may be set depending on such as a type of an application to be executed. Furthermore, it goes without saying that this threshold may be the velocity or the communication traffic volume, as long as the threshold allows the communication-terminal-status determination unit 6 to determine that the STA2 is executing the application.

Next, the communication-terminal-status determination unit 6 determines whether or not the communication is performed in the 5 GHz band (S202). When the communication is performed in the 5 GHz band (Yes in S202), the communication-terminal-status determination unit 6 of the AP1 instructs the frequency control unit 8 to move the STA3 and the STA4 to which the 5 GHz band are allocated other than the STA2, out of the STA3 to the STA5, to the 2.4 GHz band, based on the communication terminal information held by the communication terminal management unit 9. More specifically, the communication-terminal-status determination unit 6 causes the frequency control unit 8 to move the operation frequencies of the STA3 and the STA4 to which different SSIDs from the SSID assigned to the STA2 (SSID-A) are assigned, out of the STA2 to the STA4 performing the wireless communication using the 5 GHz band, to the 2.4 GHz band.

It is to be noted that the new frequency band in which the STA3 and the STA4 operate is designated here, however, the channel may be determined arbitrarily. For example, a vacant channel or a channel being used by the STA5 that is already in connection may also be designated.

Then, the communication terminal information managed by the communication terminal management unit 9 is updated as shown in FIG. 15. In the case of the first embodiment, specifically, the Band in the communication terminal information of (i) the STA3 to which the SSID-B, different from the SSID-A, is assigned and is operating in the 5 GHz band and (ii) the STA4 to which the SSID-C, different from the SSID-A, is assigned and is operating in the 5 GHz band, are changed from the 5 GHz band to the 2.4 GHz band. In this case, the STA3 and the STA4 are allocated with the same channel as the STA5 to use in the 2.4 GHz band, and thus the Channel in the communication terminal information is to be changed from "36" to "1".

When referring to FIG. 15, regarding the communication terminal information of the STA2 managed by the communication terminal management unit 9, the OldBand is updated from "−" to "5 GHz". Furthermore, regarding the communication terminal information of the STA3 managed by the communication terminal management unit 9, the Band is updated from "5 GHz" to "2.4 GHz", the Channel is updated from "36" to "1", and the OldBand is updated from "−" to "5 GHz". Furthermore, regarding the communication terminal information of the STA4 managed by the communication terminal management unit 9, the Band is updated from "5 GHz" to "2.4 GHz", the Channel is updated from "36" to "1", and the OldBand is updated from "−" to "5 GHz". Moreover, regarding the communication terminal information of the STA5 managed by the communication terminal management unit 9, the OldBand is updated from "−" to "2.4 GHz".

When the value of the Band associated with the SSID-B and the value of the Band associated with the SSID-C the SSID-C, held by the communication terminal management unit 9, are changed, the wireless communication interface 11 transmits the beacon signal including the SSID-B and the beacon signal including the SSID-C using the new frequency band (that is, the 2.4 GHz band).

Meanwhile, after this, the STA3 becomes unable to receive the beacon signal including the SSID assigned to the STA3, and the STA4 becomes unable to receive the beacon signal including the SSID assigned to the STA4, even when the beacon signals are supervised in the 5 GHz band. Therefore, the STA3 and the STA4 start the roaming. By the roaming, the STA3 becomes able to detect the beacon signal including the SSID of the STA3, and the STA4 becomes able to detect the beacon signal including the SSID of the STA4, in the 2.4 GHz band, and thus the STA3 and the STA4 are reconnected to the AP1 in the 2.4 GHz band.

With the above procedure performed by the AP1, when the STA2 executes the application requiring real-timeliness, the STA3 and the STA4 that are not executing the applications or the STA5 that is executing the application not requiring real-timeliness are moved to the 2.4 GHz band. As a result, the STA2 is allowed to execute the application without the band being overwhelmed.

Next, in order to describe the operation after S204, a case is assumed that the STA3 that has been moved to the 2.4 GHz band has executed the application requiring real-timeliness, as shown in FIG. 15.

The communication-terminal-status determination unit 6 determines, when detecting that the STA3 in the Video category is performing wireless communication at the velocity greater than 5 M bps (Yes in S201), whether or not the STA3 is operating in the 5 GHz band and whether or not the STA3 is performing the wireless communication using the 2.4 GHz band (S202). In this example, the STA3 is performing the wireless communication using the 2.4 GHz band (Yes in S202).

Next, the frequency control unit 8 of the AP1 checks the 5 GHzFlg of the STA3 and checks whether or not there is a history of the STA3 connected to the AP1 in the 5 GHz band (S204). The frequency control unit 8 determines that the STA3 has a function to connect to the 5 GHz band (Yes in S204), because the STA3 has the history of connection to the AP1 in the 5 GHz band (has the Flg indicating 1). The frequency control unit 8 then changes the operation frequency allocated to the STA3 from the 2.4 GHz band to the 5 GHz band (S205).

Next, the frequency control unit 8 of the AP1 moves the STA2, which is performing the wireless communication using the 5 GHz band and to which the SSID different from the SSID assigned to the STA3 (SSID-6) is assigned, to the 2.4 GHz band (S203). The specific content of the process is omitted since it is already described.

Here, the frequency control unit 8 may further (i) cause the communication-terminal-status determination unit 6 to determine the communication status of the STA2, and (ii) determine whether or not to move the STA2 from the 5 GHz band to the 2.4 GHz band. For example, the frequency control unit 8 may determine not to move the STA2 to the 2.4 GHz band, when the STA2 is continuously executing the application requiring real-timeliness (that is, the STA2 is performing the wireless communication at the velocity greater than 5 Mbps).

The above structure allows to prevent processes of other wireless communication terminals, each of which is executing the application requiring real-timeliness, from being interrupted due to the start of the execution of the application requiring real-timeliness by a single wireless communication terminal.

Meanwhile, when there is no history of the STA3 connected in the 5 GHz band (No in S204), the frequency control unit 8 determines that the STA3 does not have the function to connect in the 5 GHz band and does not move the SSID. Alternatively, the frequency control unit 8 may skip the process of S204 and try to communicate in the 5 GHz band regardless of the value of the 5 GHzFlg. This allows the frequency control unit 8 to move, to the 5 GHz band, the wireless communication terminal which has the function to perform the wireless communication in the 5 GHz band but has no experience in actual communication in the 5 GHz band.

Furthermore, in the first embodiment, when the communication-terminal-status determination unit 6 detects that the packet communication traffic volume of the STA2 is changed from the status greater than the threshold to the status equal to or less than the threshold, the frequency control unit 8 may move the operation frequencies of the SSID-B and the SSID-C, for which the frequency bands have been moved, back to the 5 GHz band.

The above procedure allows even the STA3 and the STA4, for which the frequency bands have been moved to the 2.4 GHz band, to be moved back to the 5 GHz band when the STA3 and the STA4 execute the application requiring real-timeliness. Therefore, the application can be executed with less effect of the interference. Furthermore, the above process can be achieved by implementing this function to only the AP1 side, because the roaming function of the STA2 to the STA4 is used. This allows an easy relocation from an existing apparatus to the AP1.

Second Embodiment

Next, the second embodiment is described. The difference between the first embodiment and the second embodiment is in the way the AP1 assigns the SSID. Specifically, it is different that, in the first embodiment, the SSID issuance control unit 7 assigns the unique SSID to each of the STA2 to the STA5, while, in the second embodiment, the SSID issuance control unit 7 assigns a unique SSID to each of the categories to which each of the STA2 to the STA5 belongs. The description on commonalities with the first embodiment is omitted in the description below to focus on differences.

The AP1 starts the WPS and so forth with the STA2 (S101), and obtains the device information of the STA2 (S102), in the same manner as the first embodiment. The device information includes, for example, the uuid, the Primary Device Type, or the Category which are assigned uniquely to each of the STA2 to the STA5.

For example, as examples of the Primary Device Type, "Television", "PVR", and "PC" are raised. Specific examples of the category are "Video", "BestEffort", or the like. It goes without saying that any identification information may be used in the Primary Device Type and the Category.

Moreover, regarding the Category, the AP1 may uniquely categorize the wireless communication terminals based on the information from the STA2. For example, when the Primary Device Type of the STA2 is the "Television" or the "PVR", in which the application requiring real-timeliness is often executed, the AP1 may determine that the category of the STA2 is the "Video". It goes without saying that the category here is according to an access category (Voice, Video, BestEffort, and BackGround) stipulated by WiFi, however, other category may be used.

After obtaining such device information of the STA2, a key exchange according to the WPS standard is executed (S103). When the predetermined key exchange is completed, the SSID issuance management unit 7 of the AP1 issues an SSID different for each of the categories to the STA2, and registers the SSID with the connection information management unit 13 (S104). Then, the SSID issuance management unit 7 distributes the connection information to the STA2, the connection information being for connecting with the AP1 (S105). This method allows to assign a different SSID to each of the categories.

Specifically, it is different that the issuance control unit 7 assigns, in the first embodiment, the SSID unique to each of the STA2 to the STA5, while, the SSID unique to each of the categories to which each of the STA2 to the STA5 belongs, in the second embodiment. Other processes shown in FIG. 3 (S101 to S103 and S105) are common with the first embodiment.

When all of the STA2 to the STA5 shown in FIG. 1 are connected to the AP1, the communication terminal information managed by the communication terminal management unit 9 of the AP1 is as shown in FIG. 16.

As shown in FIG. 16, in the communication terminal management unit 9, the following are registered as the communication terminal information of the STA2: "MAC-A" as the MAC; "Television" as the Primary Device Type; "Video" as the Category; "SSID-A" as the SSID; "5 GHz" as the Band; "1" as the 5 GHzFlg; and "–" as the Oldband.

Furthermore, in the communication terminal management unit 9, the following are registered as the communication terminal information of the STA3: "MAC-B" as the MAC, "PVR" as the Primary Device Type, "Video" as the Category, "SSID-A" as the SSID, "5 GHz" as the Band, "36" as the Channel, "1" as the 5 GHzFlg, and "–" as the Oldband.

Furthermore, in the communication terminal management unit 9, the following are registered as the communication terminal information of the STA4: "MAC-C" as the MAC, "PC" as the Primary Device Type, "BestEffort" as the Category, "SSID-C" as the SSID, "5 GHz" as the Band, "36" as the Channel, "1" as the 5 GHzFlg, and "–" as the Oldband.

Moreover, in the communication terminal management unit 9, the following are registered as the communication terminal information of the STA5: "MAC-D" as the MAC, "PVR" as the Primary Device Type, "Video" as the Category, "SSID-D" as the SSID, "2.4 GHz" as the Band, "1" as the Channel, "0" as the 5 GHzFlg, and "–" as the Oldband. It is to be noted that the operation frequency (Band) of the STA5 is the 2.4 GHz band, because the STA5 does not support the 5 GHz band. Therefore, the Category of the STA5 is the "Video", however, the STA5 is assigned with not "SSID-A" which is the same as the STA2 and the STA3 but "SSID-B".

Figure 17:
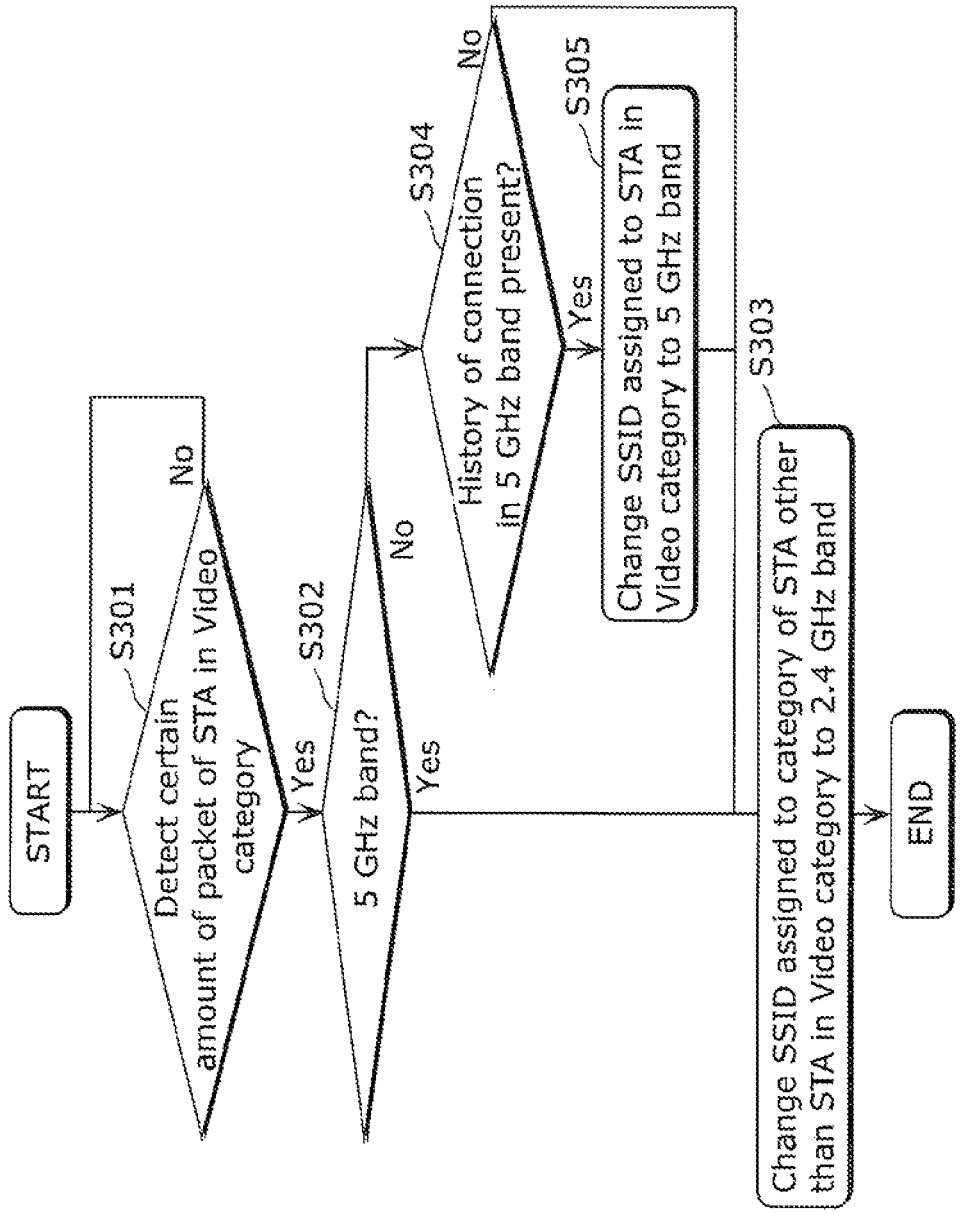
FIG. 17 is a flowchart showing a change of the SSID of the access point terminal according to the second embodiment of the present invention.

Next, an operation of the AP1 when the operation frequency is moved is described using the flowchart in FIG. 17. It is assumed here that, for example, the STA2 starts VoD viewing from the Internet.

The communication-terminal-status determination unit 6 of the AP1 always supervises, as the object to be detected, the communication traffic volume of the STA2, the STA3 and the STA5 which belong to the Video category, out of the STA2 to the STA5 managed by the communication terminal management unit 9 (S301).

When the STA2 starts the VoD, the communication-terminal-status determination unit 6 of the AP1 detects, for example, that the STA2 is performing communication at a velocity greater than 5 Mbps (the threshold) (Yes in S301). It goes without saying that this threshold may be the velocity or the communication traffic volume, as long as it allows the communication-terminal-status determination unit 6 to determine that the STA2 is executing the application.

Next, the communication-terminal-status determination unit 6 determines whether or not the communication is performed in the 5 GHz band (S302). When the communication is performed in the 5 GHz band (Yes in S302), the communication-terminal-status determination unit 6 of the AP1 instructs the frequency control unit 8 to switch the frequency band to use of the STA4, which belongs to the category different from the STA2, from the 5 GHz band to the 2.4 GHz band, based on the communication terminal information of the communication terminal management unit 9. It is to be noted that the new frequency band is designated here, however, the channel may be determined arbitrarily. For example, a vacant channel or a channel being used by the STA5 that is already in connection may be designated.

In the second embodiment, specifically, the SSID-C which is assigned to the STA4 and is operating in the 5 GHz band is changed to operate in the 2.4 GHz band. That is, the Band associated with the SSID-C of the STA4 is changed from the "5 GHz band" to the "2.4 GHz band". Accordingly, the communication terminal information managed by the communication terminal management unit 9 is updated as shown in FIG. 18.

When referring to FIG. 18, regarding the communication terminal information of the STA2 managed by the communication terminal management unit 9, the Oldband is updated from "–" to "5 GHz band". Furthermore, regarding the communication terminal information of the STA3 managed by the communication terminal management unit 9, the OldBand is updated from "–" to "5 GHz band". Furthermore, regarding the communication terminal information of the STA4 managed by the communication terminal management unit 9, the Band is updated from the "5 GHz band" to the "2.4 GHz band", the Channel is updated from "36" to "1", and the OldBand is updated from "–" to "5 GHz band". Moreover, regarding the communication terminal information of the STA5 managed by the communication terminal management unit 9, the OldBand is updated from "–" to the "2.4 GHz band".

After this, the STA4 starts the roaming because the STA4 is no longer capable of receiving the beacon signal including STA-C. Performing the roaming enables the STA4 to detect the beacon signal including the SSID-C in the 2.4 GHz band, and thus the STA4 is reconnected to the AP1 in the 2.4 GHz band.

Furthermore, in the second embodiment, when the communication-terminal-status determination unit 6 of the AP1 does not detect a certain amount of packet communication traffic volume any more, the frequency control unit 8 may move the operation frequency of the SSID-C, for which the operation frequency has been moved from the "2.4 GHz band", back to the "5 GHz band".

The above procedure taken by the AP1 allows the STA2, the STA3, and the STA5, each of which executes the application requiring real-timeliness, to be divided by categories and thus enables a compartmentalization of the frequency bands of the wireless LANs. As a result, an artifact due to the overwhelmed band or a decrease in the velocity is mitigated. Moreover, the difficulty in introducing the roaming function of the STA2 to the STA5 is lowered.

Third Embodiment

The difference between the third embodiment and the first embodiment is in a specific procedure of determining whether or not the STA2, the STA3 and the STA5 has executed the application requiring real-timeliness. Specifically, it is different that the communication-terminal-status determination unit 6 determines, in the first embodiment, based on whether or not the volume of the wireless communication is greater than the threshold, while, in the second embodiment, based on whether or not priority of communication data is greater than the threshold. It is to be noted that to perform communication with priority of communication data greater than the threshold is an example of the communication status to satisfy the predetermined condition. The description on commonalities with the first embodiment is omitted in the description below to focus on differences.

In the third embodiment, a specific process is described in detail, where the process is for determining, by the communication-terminal-status determination unit 6, that the STA2 has executed the application requiring real-timeliness. Other process operations by the AP1 are common with the first embodiment.

Figure 20:
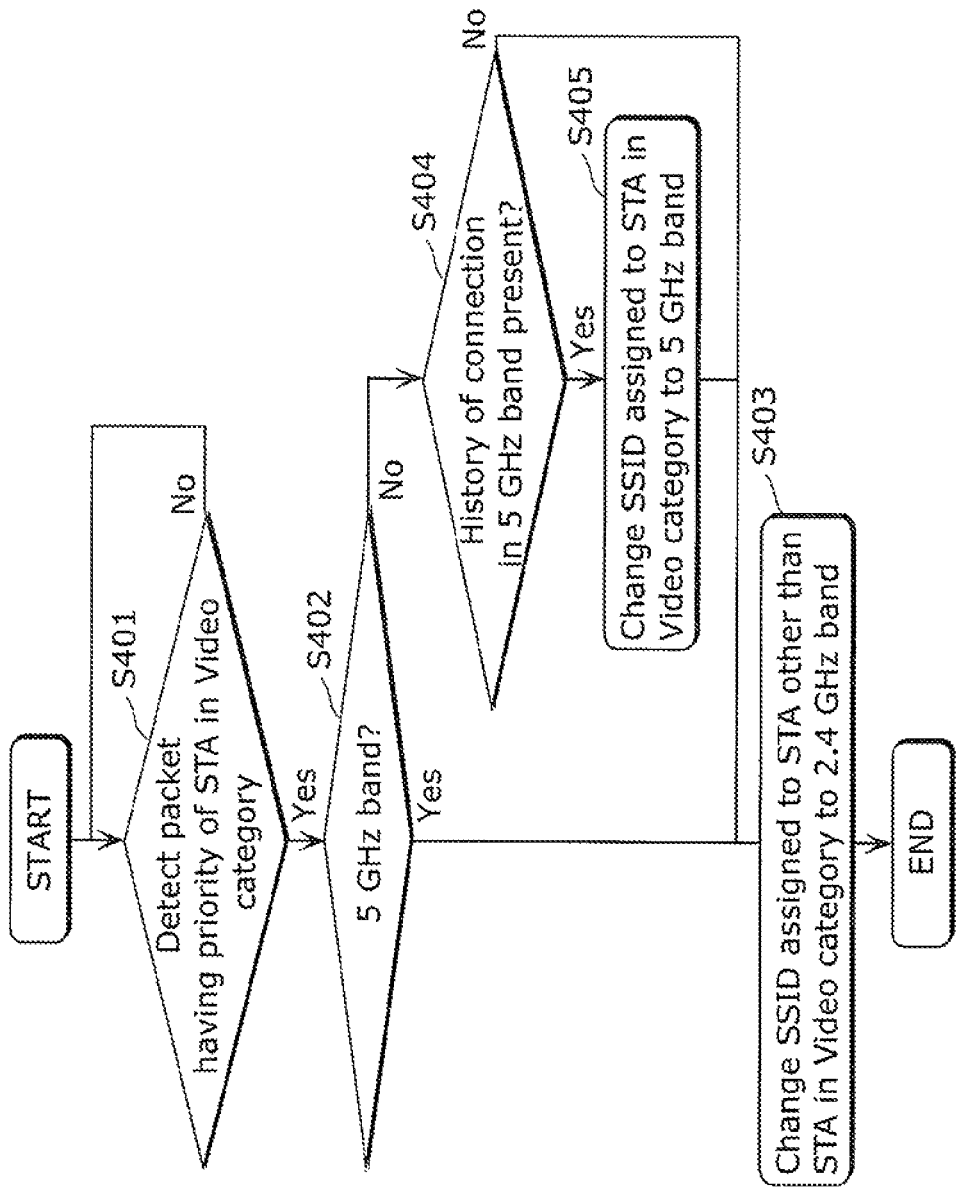
FIG. 20 is a flowchart showing a change of the SSID of the access point terminal according to an third embodiment of the present invention.
Figure 21:
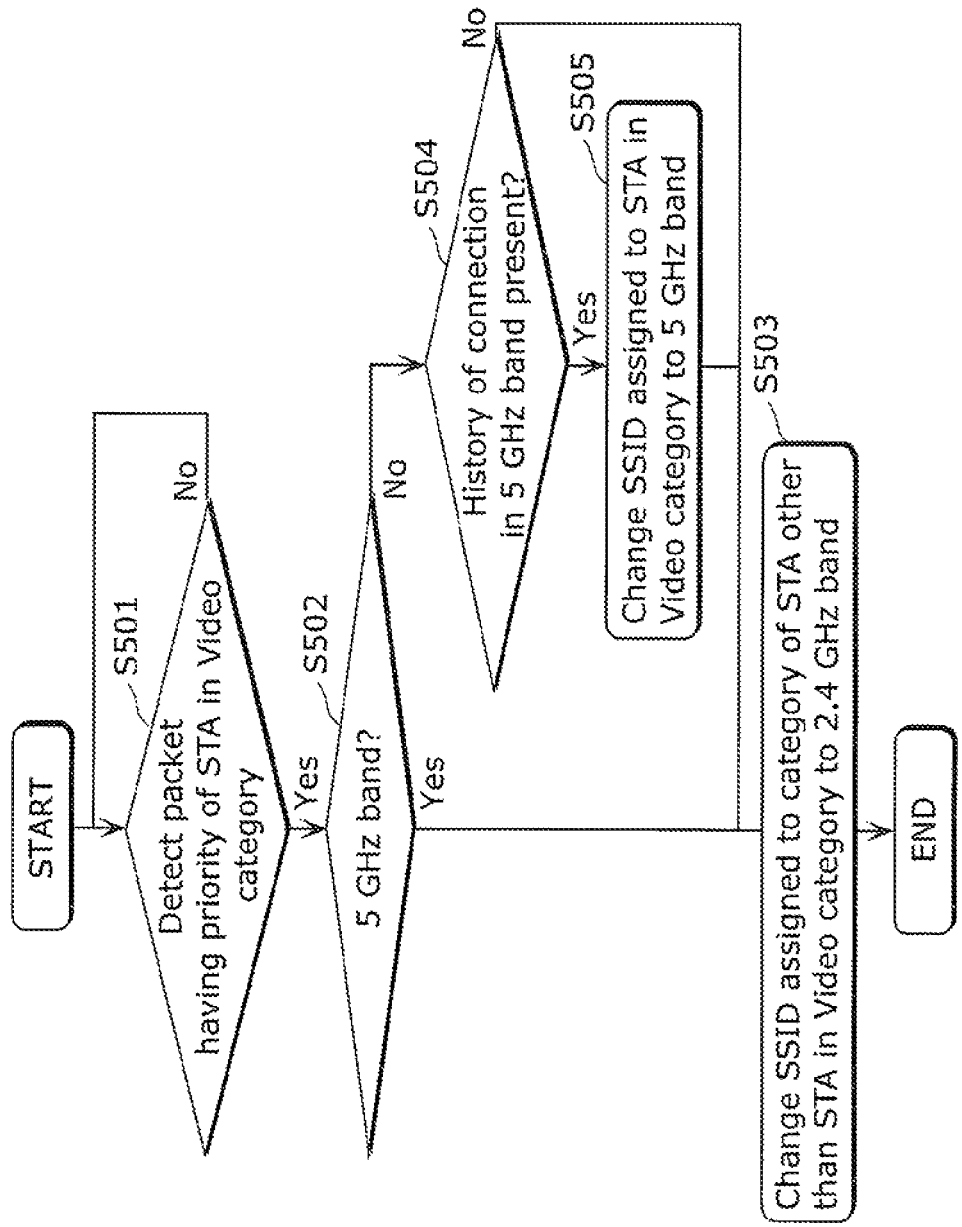
FIG. 21 is a flowchart showing a change of the SSID of the access point terminal according to an fourth embodiment of the present invention.

As shown in FIG. 20, the communication-terminal-status determination unit 6 of the AP1 always supervises, as the object to be detected, the priority of the STA2, STA3 and the STA5 which belong to the Video category, out of the STA2 to the STA5 managed by the communication terminal management unit 9.

Figure 19:
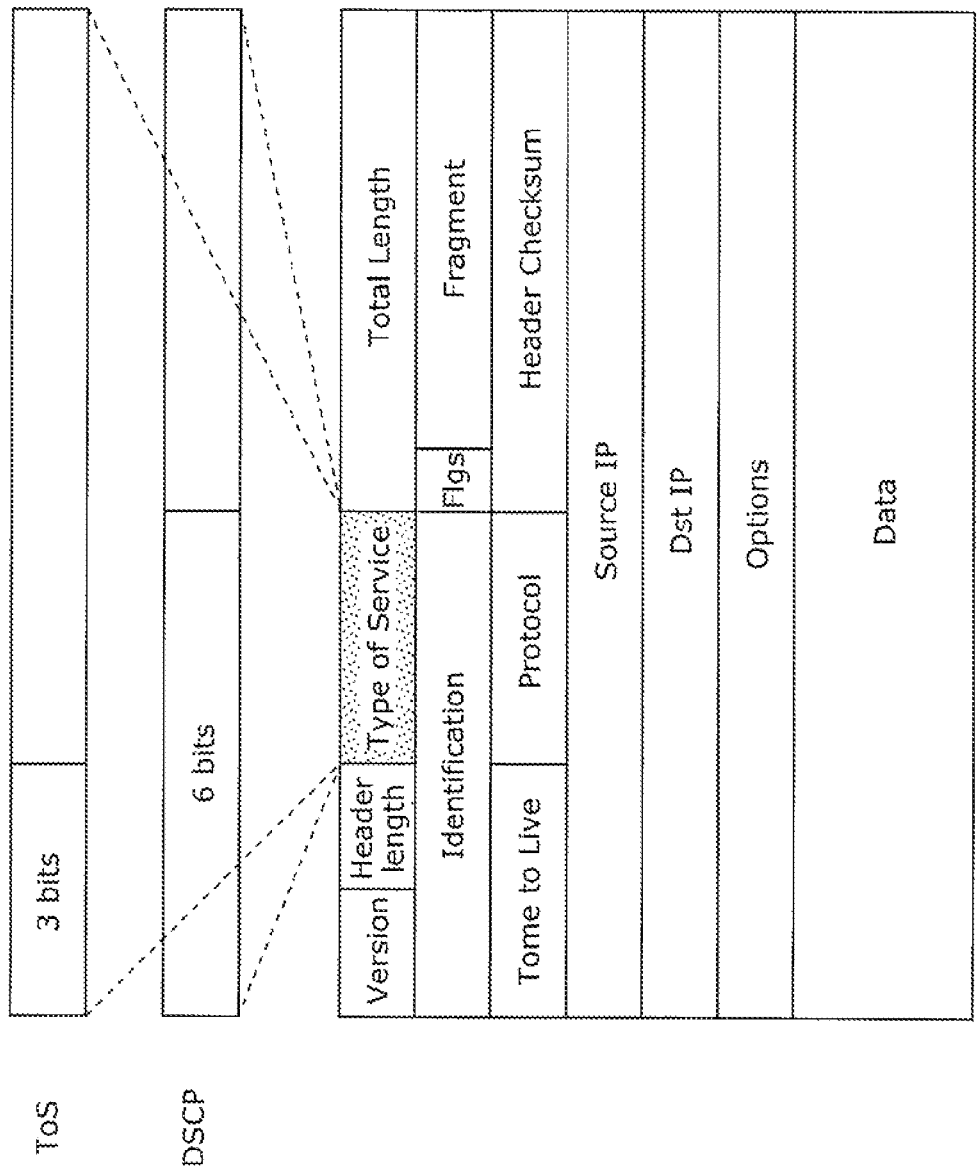
FIG. 19 shows a field structure of an IP packet.

An example of the object to be detected is (i) a Type of Service (ToS) field or (ii) a DSCP field, shown in FIG. 19, each of which indicates the priority of the IP packet. These are fields which describe the priority of the IP packet, and the ToS field, for example, describes eight levels of priority. The priority of a Video stream, stipulated by WiFi and so forth, is described as 5.

When the STA2 starts the VoD, the priority is added to a ToS field of an IP header of a packet, where the packet is set with an IP address of the STA2 as an destination address. The communication-terminal-status determination unit 6 detects whether or not the priority is equal to or more than a certain stipulation (for example, equal to or more than 5) (S401). Regarding the stipulation for the priority, it goes without saying that the priority is not necessarily be equal to or more than 5, as long as it is complying with a system or a standard. Furthermore, it goes without saying that it is sufficient when it allows the communication-terminal-status determination unit 6 to determine that the STA2 is executing the application.

Then, the frequency control unit 8 performs the same process as in the first embodiment to change the association between the SSID and the Band in the communication terminal management unit 9, to (i) cause the STA2, which has executed the application requiring high real-timeliness, to operate in the 5 GHz band, and (ii) cause the to STA3 to the STA5, other than the STA2, to operate in the 2.4 GHz band.

Furthermore, in the third embodiment, when the communication-terminal-status determination unit 6 does not detect the packet of the STA2 added with the priority for a certain period, the frequency control unit 8 may move the operation frequencies of the SSID-B and the SSID-C, for which the operation frequencies have been moved, from the "2.4 GHz band" back to the "5 GHz band".

Fourth Embodiment

The difference between the fourth embodiment and the second embodiment is in a specific procedure of determining whether or not the STA2, the STA3 and the STA5, in the Video category, have executed the application requiring real-timeliness. Specifically, it is different that the communication-terminal-status determination unit 6 determines, in the second embodiment, based on whether or not the volume of the wireless communication is greater than the threshold, while, in the fourth embodiment, based on whether or not the priority of the communication data is greater than the threshold. The description on commonalities with the second embodiment is omitted in the description below to focus on differences.

In the fourth embodiment, a specific process is described in detail, where the process is for determining, by the communication-terminal-status determination unit 6, that the STA2 has executed the application requiring real-timeliness. Other process operations by the AP1 are common with the second embodiment.

The communication-terminal-status determination unit 6 of the AP1 always supervises, as the object to be detected, the priority of communication packets of STA2, the STA3 and the STA5 which belong to the Video category, out of the STA2 to the STA5 managed by the communication terminal management unit 9.

An example of the object to be detected is 1) a Type of Service (ToS) field or 2) a DSCP field, shown in FIG. 19, each of which indicates the priority of the IP packet. These are fields which describe the priority of the IP packet, and the ToS field, for example, describes eight levels of priority. The priority of the Video stream, stipulated by WiFi and so forth, is described as 5.

When the STA2 starts the VoD, the priority is added to the ToS field of the IP header of the packet, where the packet is set with the IP address of the STA2 as the destination address. The communication-terminal-status determination unit 6 detects whether or not the priority is equal to or more than a certain stipulation (for example, equal to or more than 5) (S401). Regarding the stipulation for the priority, it goes without saying that the priority is not necessarily be equal to or more than 5, as long as it is complying with a system or a standard. It goes without saying that it is sufficient when it allows the communication-terminal-status determination unit 6 to determine that the STA2 is executing the application.

Then, the frequency control unit 8 performs the same process as in the first embodiment to changes the association between the SSID and the Band in the communication terminal management unit 9, to (i) cause the STA2 that has executed the application requiring high real-timeliness and the STA3 that belongs to the same category as the STA2, to operate in the 5 GHz band, and (ii) cause the STA4 and the STA5, other than the STA2 and the STA3, to operate in the 2.4 GHz band.

Furthermore, in the fourth embodiment, when the communication-terminal-status determination unit 6 does not detect the packet of the STA2 added with the priority for a certain period, the frequency control unit 8 may move the operation frequency of the SSID-C, for which the operation frequency has been moved, from the "2.4 GHz band" back to the "5 GHz band".

Fifth Embodiment

Figure 22:
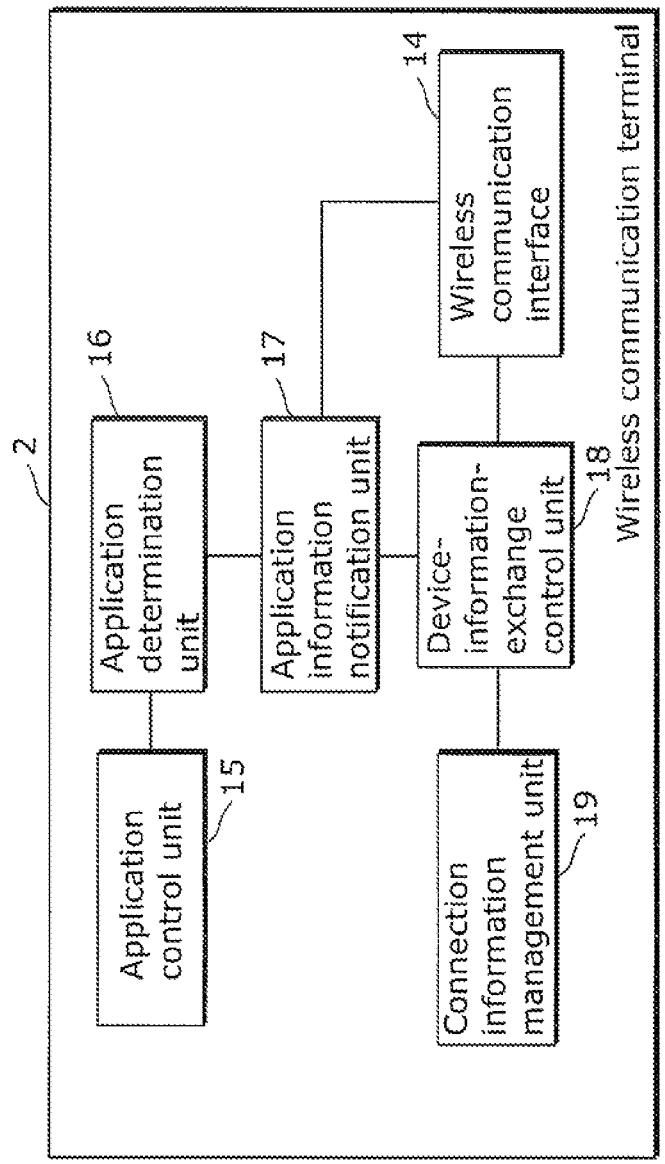
FIG. 22 is a functional block diagram of the access point terminal according to an fifth embodiment of the present invention.

Next, the fifth embodiment is described. First, the structure of the wireless communication terminal (STA) 2 is described using FIG. 22. The STA2 in the fifth embodiment includes a wireless communication interface 14, an application control unit 15, an application determination unit 16, an application information notification unit 17, a device-information-exchange control unit 18, and a connection information management unit 19.

The wireless communication interface 14 is an interface for transmitting and receiving a wireless signal between the AP1. That is, the wireless communication interface 14 transmits, as the wireless signal, the data generated by the application information notification unit 17, the device-information-exchange control unit 18, and so forth, to the AP1. Furthermore, the wireless communication interface 14 generates data from the wireless signal received from the AP1, and notifies the generated data to the device-information-exchange control unit 18, or the like. Moreover, the wireless communication interface 11 receives the beacon signal transmitted from the AP1 in a predetermined time interval.

The application control unit 15 executes an application requiring the wireless communication between the AP1. An example of such an application is an application which performs streaming reproduction of an image data from a content server and so forth. The application determination unit 16 determines the real-timeliness in the wireless communication required for the application to be executed by the application control unit 15. The application information notification unit 17 notifies, to the AP1, the result of determination by the application determination unit 16. Specifically, the application information notification unit 17 transmits the application execution notification to the AP1, when the application requiring real-timeliness in the wireless communication has been started. Meanwhile, the application information notification unit 17 transmits the application completion notification to the AP1, when the execution of the application which has been executed by the application control unit 15 is completed.

The device-information-exchange control unit 18 exchanges the device information between the AP1. That is, the device-information-exchange control unit 18 (i) transmits the device information of the STA2 to the AP1 and (ii) obtains the device information of the AP1. The connection information management unit 19 holds information (key information, etc.) required by the wireless communication terminal for performing wireless communication with the AP1.

It is to be noted that, after receiving the application execution notification from the STA2, the AP1 uses (i) the 5 GHz band for the wireless communication with the STA2 and (ii) the 2.4 GHz band for the wireless communication with other STAs, the STA3 to the STA5, each of which is assigned with the SSID different from the STA2. Meanwhile, after receiving the application completion notification from the STA2, the AP1 returns the frequency band of the STA that has had the frequency band switched according to the application execution notification back to the frequency band used prior to the switching, out of the STA3 to the STA5.

Figure 23:
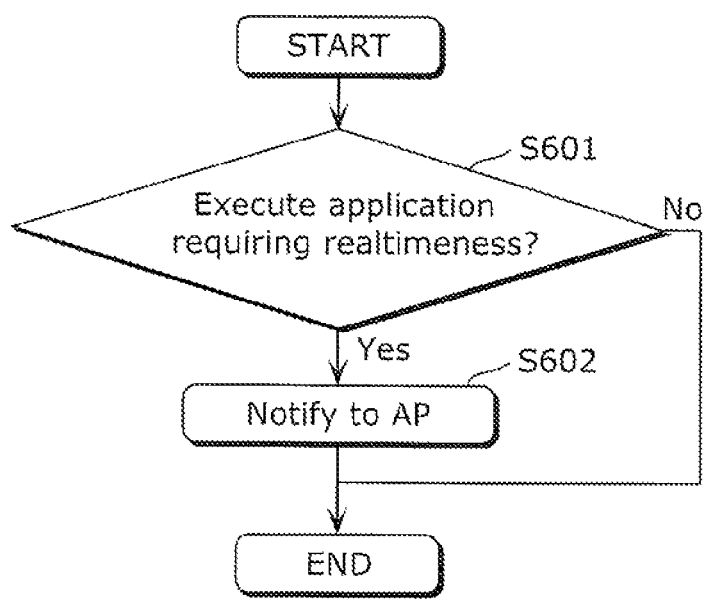
FIG. 23 is a flowchart showing an operation of the access point terminal according to the fifth embodiment of the present invention.

Next, the operation of the STA2 according to the fifth embodiment is described, using the flowchart in FIG. 23. In the fifth embodiment, it is assumed that the STA2 has executed the VoD. Furthermore, the state of the STA2 connected with the AP1 is the same as in the first embodiment, and the communication terminal information shown in FIG. 13 is held by the communication terminal management unit 9 of the AP1.

The application determination unit 16 of the STA2 determines whether or not the STA2 is executing the application requiring high real-timeliness in the wireless communication (for example, a video viewing using the VoD or DLNA).

When the application determination unit 16 determines that the high real-timeliness is required (Yes in S601), the application information notification unit 17 transmits the application execution notification to the AP1 (S602). It is to be noted that the way of notification is not limited. It goes without saying that, for example, the application execution notification may be included in an Information Elements (IE) of a MAC frame in the wireless LAN, or may be a packet in an IP layer. It is sufficient when it is notified to the AP1 that the application has been executed.

Figure 24:
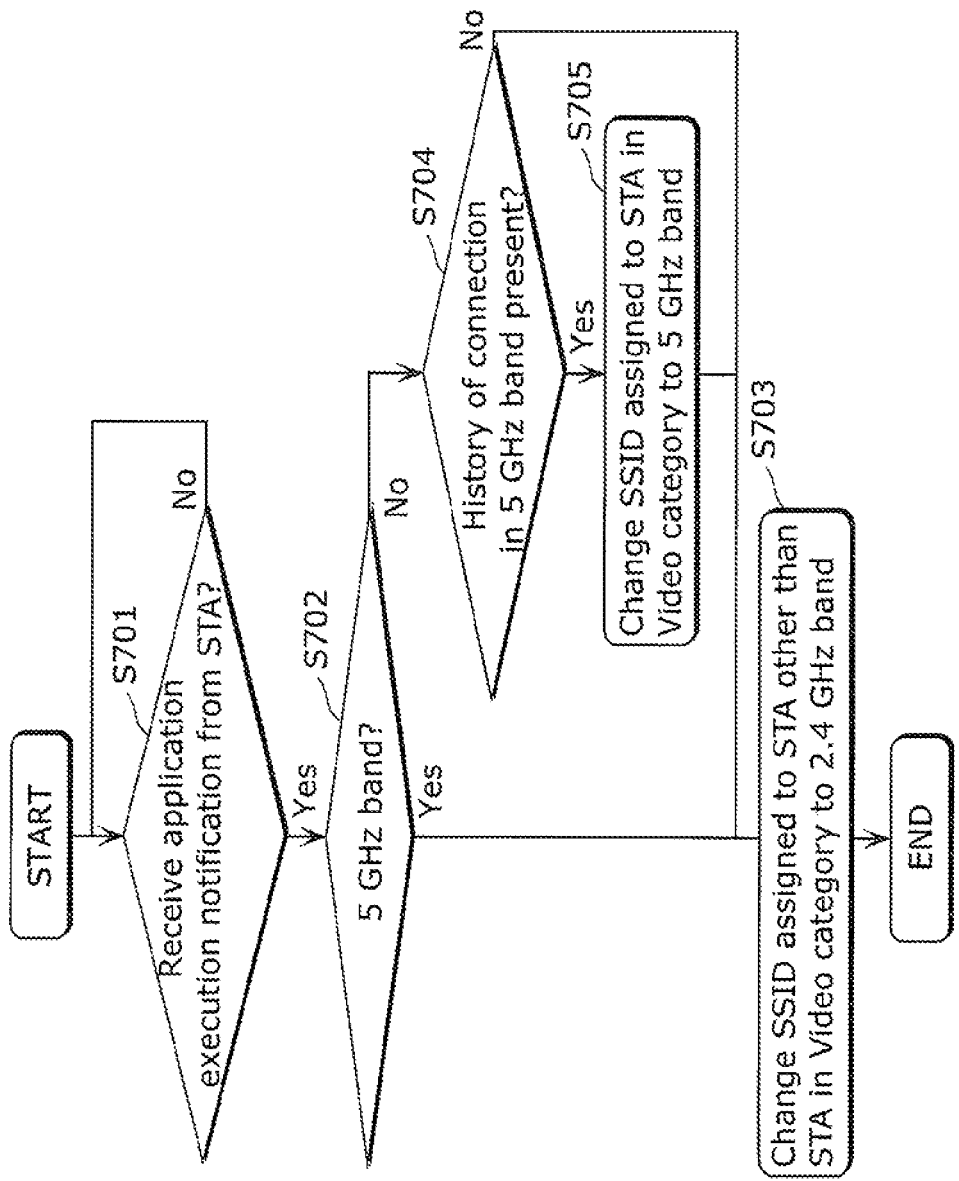
FIG. 24 is a flowchart showing a change of the SSID of the access point terminal according to the fifth embodiment of the present invention.
Figure 25:
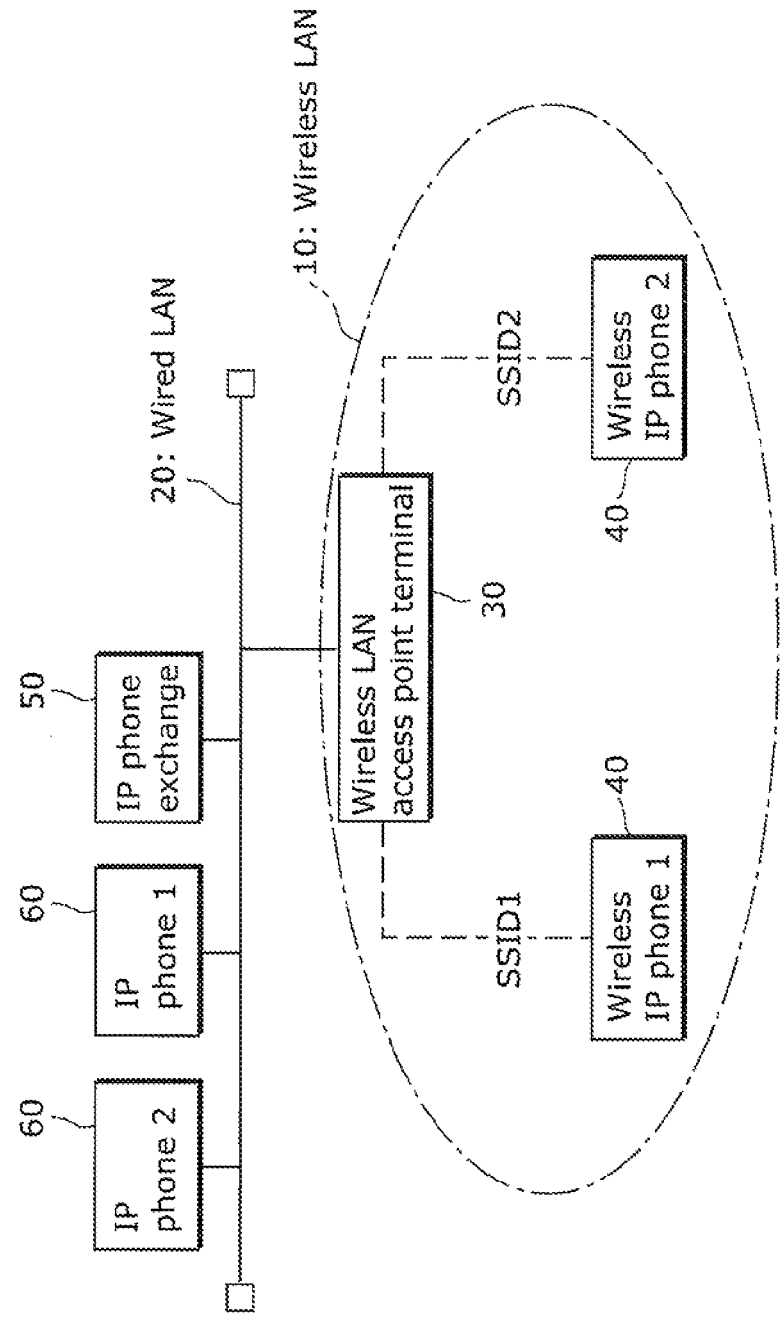
FIG. 25 shows a conventional technique.

Next, the operation of the AP1 after receiving the application execution notification from the STA2 is described, using the flowchart in FIG. 24.

When the application execution notification is received from the STA2 (Yes in S701), the communication-terminal-status determination unit 6 determines whether or not the communication is performed in the 5 GHz band (S702).

When the communication is performed in the 5 GHz band (Yes in S702), the communication-terminal-status determination unit 6 of the AP1 instructs the frequency control unit 8 to move the frequency bands of the STA3 and the STA4, which belong to the category different from the STA2, from the "5 GHz band" to the "2.4 GHz band", based on the communication terminal information in the communication terminal management unit 9. It is to be noted that the frequency band is designated here, however, the channel may be determined arbitrarily. For example, a vacant channel or a channel being used by the STA5 that is already in connection may be designated.

In the case of the fifth embodiment, specifically, regarding the communication terminal information of the STA3 and the STA4, each of which is currently performing wireless communication using the 5 GHz band and assigned with the SSID different from the STA2, the Band associated with the SSID-B and the Band associated with the SSID-C are switched from the "5 GHz band" to the "2.4 GHz band".

When the Band associated with the SSID-B and the Band associated with the SSID-C are changed, the STA3 and the STA4 start the roaming, because the STA3 becomes unable to receive the beacon signal including the SSID of the STA3 and the STA4 becomes unable to receive the beacon signal including the SSID of the STA4, in the 5 GHz band. By performing the roaming, the STA3 becomes able to detect the beacon signal including the SSID of the STA3 in the 2.4 GHz band, and the STA4 becomes able to detect the beacon signal including the SSID of the STA4 in the 2.4 GHz band, and thus the STA3 and the STA4 are reconnected to the AP1 in the 2.4 GHz band.

Next, in order to describe the operation after S204, a case is assumed that the STA3, which has been moved to the 2.4 GHz band, has executed the application requiring the real-timeliness.

The communication-terminal-status determination unit 6 receives the application execution notification from the STA3 (S701). The communication-terminal-status determination unit 6 determines that the communication is performed in the 2.4 GHz band in S702 (No in S702).

Next, the communication-terminal-status determination unit 6 checks the 5 GHzFlg of the STA3 and checks whether or not the STA3 is connected in the 5 GHz band. Since the STA3 has the history of connection in the 5 GHz band (has the Flg indicating 1), the communication-terminal-status determination unit 6 determines that the STA3 has the function to connect in the 5 GHz band (Yes in S704), and the frequency control unit 8 changes the operation frequency from the "2.4 GHz band" to the "5 GHz band" (S705). When the STA3 has no history of connection in the 5 GHz band, the communication-terminal-status determination unit 6 determines that the STA3 does not have the function to connect in the 5 GHz band (No in S704), and the frequency control unit 8 does not change the operation frequency.

Furthermore, the fifth embodiment is described based on the first embodiment, however, the operations after receiving the application execution notification from the STA2 may be replaced with the operations in the second embodiment.

Furthermore, in the fifth embodiment, when the execution of the application is completed, the STA2 transmits the application completion notification to the AP1. After receiving the application completion notification, the AP1 may return the operation frequencies of the STA3 and the STA4 that have had the frequency bands switched upon receiving the preceding application execution notification to the "5 GHz band" from the "2.4 GHz band".

The above procedure allows to implement the switching of the operation frequencies at appropriate timing, by linking with the application requiring high real-timeliness in the wireless communication.

Other Modification Examples

It is to be noted that although the present invention is described based on aforementioned embodiment, the present invention is obviously not limited to such embodiment. The following cases are also included in the present invention.

Each of the aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer, in order to achieve predetermined functions.

A part or all of the constituent elements constituting the respective apparatuses may be configured from a single System-LSI (Large-Scale Integration). The System-LSI is a super-multi-function LSI manufactured by integrating constituent elements on one chip, and is specifically a computer system configured by including a microprocessor, a ROM, a RAM, and so forth. The System-LSI is a super-multi-function LSI manufactured by integrating constituent elements on one chip, and is specifically a computer system configured by including a microprocessor, a ROM, a RAM, and so forth. A computer program is stored in the RAM. The respective apparatuses achieve their functions through the microprocessor's operation according to the computer program.

A part or all of the constituent elements constituting the respective apparatuses may be configured as an IC card which can be attached and detached from the respective apparatuses or as a stand-alone module. The IC card or the module may also include the aforementioned super-multi-function LSI. The IC card or the module achieves its function through the microprocessor's operation according to the computer program. The IC card or the module may also be implemented to be tamper-resistant.

The present invention may be a method of the above. The present invention may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so forth.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

The above embodiment and the modification examples may be combined respectively.

The embodiment of the present invention has been described with reference to the diagrams, however, the present invention is not limited to the embodiment illustrated. It is possible to add, to the embodiment illustrated, various corrections or modifications along with the full scope of equivalents to the present invention.

INDUSTRIAL APPLICABILITY

An access point terminal and a wireless communication terminal according to the present invention are useful in a wireless LAN network which switches an operation frequency depending on an application.

What is claimed is:
1. An access point terminal which performs wireless communication with each of a plurality of wireless communication terminals, using one of a plurality of frequency bands, said access point terminal comprising:
a processor; and
a non-transitory memory having stored thereon executable instructions, which when executed, cause the processor to execute:

assigning a Service Set Identifier (SSID) to each of the wireless communication terminals requesting a start of the wireless communication, said access point terminal holding communication terminal information indicating, for each of the wireless communication terminals, (i) the SSID assigned to the wireless communication terminal and (ii) a frequency band being used for the wireless communication with the wireless communication terminal, such that the SSID and the frequency band are associated with each other;

determining a communication status of one wireless communication terminal out of the wireless communication terminals, by obtaining a wireless signal transmitted or received by the one wireless communication terminal; and when the communication status of the one wireless communication terminal is determined to satisfy a predetermined condition, (i) switching the frequency band currently being used for the wireless communication with the one wireless communication terminal to a first frequency band by associating the SSID assigned to the one wireless communication terminal and the first frequency band in the communication terminal information held by said access point terminal without changing the SSID assigned to the one wireless communication terminal, and (ii) switching the frequency band currently being used for the wireless communication with one or more of the wireless communication terminals other than the one wireless communication terminal to a second frequency band other than the first frequency band by associating each of the SSIDs assigned to the one or more of the wireless communication terminals and the second frequency band in the communication terminal information held by said access point terminal without changing each of the SSIDs assigned to the one or more of the wireless communication terminals, wherein a traffic volume of a wireless signal transmitted or received by each of the wireless communication terminals that are of a specific device type that requires real-timeliness in the wireless communication is determined as the communication status, and when the traffic volume of the wireless signal transmitted or received by one of the wireless communication terminals that are of the specific device type is determined to be greater than a predetermined threshold, (i) the first frequency band is used for the wireless communication with the wireless communication terminals that are of the specific device type, and (ii) the second frequency band other than the first frequency band is used for the wireless communication with the wireless communication terminal other than the wireless communication terminals that are of the specific device type.

2. A wireless communication system comprising a plurality of wireless communication terminals and an access point terminal which perform wireless communication using one of a plurality of frequency bands, wherein one wireless communication terminal, from out of said wireless communication terminals, (i) executes an application which requires the wireless communication with said access point terminal, (ii) determines real-timeliness in the wireless communication required for the executed application, and (iii) transmits an application execution notification to said access point terminal when the determined real-timeliness is greater than the predetermined threshold, and said access point terminal includes:
a processor; and
a non-transitory memory having stored thereon executable instructions, which when executed, cause the processor to execute:

assigning a Service Set Identifier (SSID) to each of the wireless communication terminals requesting a start of wireless communication, said access point terminal holding communication terminal information indicating, for each of said wireless communication terminals, (i) the SSID assigned to said wireless communication terminal and (ii) a frequency band being used for the wireless communication with said wireless communication terminal, such that the SSID and the frequency band are associated with each other;

determining a communication status of said one wireless communication terminal, by receiving the application execution notification; and when the communication status of said one wireless communication terminal is determined to satisfy a predetermined condition, (i) switching the frequency band currently being used for the wireless communication with said one wireless communication terminal to a first frequency band by associating the SSID assigned to said one wireless communication terminal and the first frequency band in the communication terminal information held by said access point terminal without changing the SSID assigned to said one wireless communication terminal, and (ii) switching the frequency band currently being used for the wireless communication with one or more of said wireless communication terminals other than said one wireless communication terminal to a second frequency band other than the first frequency band by associating each of the SSIDs assigned to said one or more of said wireless communication terminals and the second frequency band in the communication terminal information held by said access point terminal without changing each of the SSIDs assigned to said one or more of said wireless communication terminals, wherein a traffic volume of a wireless signal transmitted or received by each of the wireless communication terminals that are of a specific device type that requires real-timeliness in the wireless communication is determined as the communication status, and when the traffic volume of the wireless signal transmitted or received by one of the wireless communication terminals that are of the specific device type is determined to be greater than a predetermined threshold, (i) the first frequency band is used for the wireless communication with the wireless communication terminals that are of the specific device type, and (ii) the second frequency band other than the first frequency band is used for the wireless communication with the wireless communication terminal other than the wireless communication terminals that are of the specific device type.

3. A method of performing, using an access point terminal, wireless communication with each of a plurality of wireless communication terminals, using one of a plurality of frequency bands, said method comprising:

assigning a Service Set Identifier (SSID) to each of the wireless communication terminals requesting a start of wireless communication, the access point terminal holding communication terminal information indicating, for each of the wireless communication terminals, (i) the SSID assigned to the wireless communication terminal and (ii) a frequency band being used for the wireless communication with the wireless communication terminal, such that the SSID and the frequency band are associated with each other;

determining a communication status of one wireless communication terminal out of the wireless communication terminals, by obtaining a wireless signal transmitted or received by the one wireless communication terminal; and when the communication status of the one wireless communication terminal is determined to satisfy a predetermined condition,
  (i) switching the frequency band currently being used for the wireless communication with the one wireless communication terminal to a first frequency band by associating the SSID assigned to the one wireless communication terminal and the first frequency band in the communication terminal information held by the access point terminal without changing the SSID assigned to the one wireless communication terminal, and
(ii) switching the frequency band currently being used for the wireless communication with one or more of the wireless communication terminals other than the one wireless communication terminal to a second frequency band other than the first frequency band by associating each of the SSIDs assigned to the one or more wireless communication terminals and the second frequency band in the communication terminal information held by the access point terminal without changing each of the SSIDs assigned to the one or more wireless communication terminals, wherein a traffic volume of a wireless signal transmitted or received by each of the wireless communication terminals that are of a specific device type that requires real-timeliness in the wireless communication is determined as the communication status, and when the traffic volume of the wireless signal transmitted or received by one of the wireless communication terminals that are of the specific device type is determined to be greater than a predetermined threshold, (i) the first frequency band is used for the wireless communication with the wireless communication terminals that are of the specific device type, and (ii) the second frequency band other than the first frequency band is used for the wireless communication with the wireless communication terminal other than the wireless communication terminals that are of the specific device type.

4. A non-transitory computer-readable recording medium for use in a computer and on which a program is recorded, the program being for causing the computer to perform wireless communication with each of a plurality of wireless communication terminals, using one of a plurality of frequency bands, and the program causing the computer to execute:

assigning a Service Set Identifier (SSID) to each of the wireless communication terminals requesting a start of wireless communication, the computer holding communication terminal information indicating, for each of the wireless communication terminals, (i) the SSID assigned to the wireless communication terminal and (ii) a frequency band being used for the wireless communication with the wireless communication terminal, such that the SSID and the frequency band are associated with each other;

determining a communication status of one wireless communication terminal out of the wireless communication terminals, by obtaining a wireless signal transmitted or received by the one wireless communication terminal; and when the communication status of the one wireless communication terminal is determined to satisfy a predetermined condition,
  (i) switching the frequency band currently being used for the wireless communication with the one wireless communication terminal to a first frequency band by associating the SSID assigned to the one wireless communication terminal and the first frequency band in the communication terminal information held by the computer without changing the SSID assigned to the one wireless communication terminal, and
  (ii) switching the frequency band currently being used for the wireless communication with one or more of the wireless communication terminals other than the one wireless communication terminal to a second frequency band other than the first frequency band by associating each of the SSIDs assigned to the one or more wireless communication terminals and the second frequency band in the communication terminal information held by the computer without changing each of the SSIDs assigned to the one or more wireless communication terminals, wherein a traffic volume of a wireless signal transmitted or received by each of the wireless communication terminals that are of a specific device type that requires real-timeliness in the wireless communication is determined as the communication status, and when the traffic volume of the wireless signal transmitted or received by one of the wireless communication terminals that are of the specific device type is determined to be greater than a predetermined threshold, (i) the first frequency band is used for the wireless communication with the wireless communication terminals that are of the specific device type, and (ii) the second frequency band other than the first frequency band is used for the wireless communication with the wireless communication terminal other than the wireless communication terminals that are of the specific device type.

5. An integrated circuit which performs wireless communication with each of a plurality of wireless communication terminals, using one of a plurality of frequency bands, said integrated circuit comprising:

a processor; and a non-transitory memory having stored thereon executable instructions, which when executed, cause the processor to execute:

assigning a Service Set Identifier (SSID) to each of the wireless communication terminals requesting a start of wireless communication, said integrated circuit holding communication terminal information indicating, for each of the wireless communication terminals, (i) the SSID assigned to the wireless communication terminal and (ii) a frequency band being used for the wireless communication with the wireless communication terminal, such that the SSID and the frequency band are associated with each other;

determining a communication status of one wireless communication terminal out of the wireless communication terminals, by obtaining a wireless signal transmitted or received by the one wireless communication terminal; and when the communication status of the one wireless communication terminal is determined to satisfy a predetermined condition, (i) switching the frequency band currently being used for the wireless communication with the one wireless communication terminal to a first frequency band by associating the SSID assigned to the one wireless communication terminal and the first frequency band in the communication terminal information held by said integrated circuit without changing the SSID assigned to the one wireless communication terminal, and (ii) switching the frequency band currently being used for the wireless communication with one or more of the wireless communication terminals other than the one wireless communication terminal to a second frequency band other than the first frequency band by associating each of the SSIDs assigned to the one or more wireless communication terminals and the second frequency band in the communication terminal information held by said integrated circuit without changing each of the SSIDs assigned to the one or more wireless communication terminals, wherein a traffic volume of a wireless signal transmitted or received by each of the wireless communication terminals that are of a specific device type that requires real-timeliness in the wireless communication is determined as the communication status, and when the traffic volume of the wireless signal transmitted or received by one of the wireless communication terminals that are of the specific device type is determined to be greater than a predetermined threshold, (i) the first frequency band is used for the wireless communication with the wireless communication terminals that are of the specific device type, and (ii) the second frequency band other than the first frequency band is used for the wireless communication with the wireless communication terminal other than the wireless communication terminals that are of the specific device type.

* * * * *